(12) United States Patent
Aiglstorfer

(10) Patent No.: US 12,423,746 B2
(45) Date of Patent: Sep. 23, 2025

(54) SYSTEMS AND METHODS FOR PROVIDING FINANCIAL SERVICE EXTENSIONS

(71) Applicant: mFoundry, Inc., Jacksonville, FL (US)

(72) Inventor: Rodney Aiglstorfer, Minden, NV (US)

(73) Assignee: FIDELITY INFORMATION SERVICES, LLC, Jacksonville, FL (US)

(*) Notice: Subject to any disclaimer, the term of this patent is extended or adjusted under 35 U.S.C. 154(b) by 0 days.

(21) Appl. No.: 16/857,258

(22) Filed: Apr. 24, 2020

(65) Prior Publication Data
US 2020/0250742 A1      Aug. 6, 2020

Related U.S. Application Data

(63) Continuation of application No. 15/355,030, filed on Nov. 17, 2016, now Pat. No. 11,068,974, which is a
(Continued)

(51) Int. Cl.
*G06Q 40/00* (2023.01)
*G06F 9/445* (2018.01)
*G06Q 30/0241* (2023.01)

(52) U.S. Cl.
CPC ......... *G06Q 40/00* (2013.01); *G06F 9/44526* (2013.01); *G06Q 30/0241* (2013.01)

(58) Field of Classification Search
CPC .............. G06Q 40/00; G06Q 30/0241; G06F 9/44526; G06F 9/445
See application file for complete search history.

(56) References Cited

U.S. PATENT DOCUMENTS 5,764,985 A     6/1998  Smale
5,991,749 A    11/1999  Morrill, Jr.
(Continued)

FOREIGN PATENT DOCUMENTS

CN     102572541 A   *  7/2012
KR    20100019165 A   *  2/2010

OTHER PUBLICATIONS

Ana Afonso and Mario Silva, "Dynamic Information Dissemination to Mobile Users," 2004, Kluwer Academic Publishers 9, pp. 529-536. (Year: 2004).*

(Continued)

*Primary Examiner* — Kenneth Bartley
(74) *Attorney, Agent, or Firm* — Finnegan, Henderson, Farabow, Garrett & Dunner, LLP

(57) ABSTRACT

Systems and methods are provided for providing financial service extensions. In one implementation, a financial cloud system including a memory storing instructions and a processor configured to execute the instructions is provided. The instructions may be executed to perform a process associated with providing the financial service extensions. The process may include providing a platform application to a client device. The process may also include receiving data associated with a financial service extension to be used in connection with the platform application. The process may further include receiving configuration data associated with the financial service extension. The process may additionally include configuring, by the processor, the financial service extension for use with the platform application. The process may also include providing, by the processor, the financial service extension to the client device.

19 Claims, 21 Drawing Sheets

Related U.S. Application Data continuation of application No. 14/072,133, filed on Nov. 5, 2013, now Pat. No. 9,514,492.

(60) Provisional application No. 61/722,930, filed on Nov. 6, 2012, provisional application No. 61/722,939, filed on Nov. 6, 2012, provisional application No. 61/722,626, filed on Nov. 5, 2012.

(56) References Cited

U.S. PATENT DOCUMENTS

| | | | |
|---|---|---|---|
| 5,999,941 | A | 12/1999 | Andersen |
| 6,125,402 | A * | 9/2000 | Nagarajayya ........... G06F 9/465 719/330 |
| 6,295,551 | B1 | 9/2001 | Roberts et al. |
| 6,301,626 | B1 * | 10/2001 | Knox ..................... G06F 3/0238 400/89 |
| 6,334,117 | B1 * | 12/2001 | Covert ..................... G06F 3/023 705/43 |
| 6,581,109 | B1 * | 6/2003 | Fields ..................... H04L 29/06 345/589 |
| 6,901,382 | B1 * | 5/2005 | Richards ................. G06F 3/023 705/35 |
| 7,051,096 | B1 | 5/2006 | Krawiec et al. |
| 7,058,940 | B2 | 6/2006 | Calahan |
| 7,225,249 | B1 | 5/2007 | Barry et al. |
| 7,545,816 | B1 | 6/2009 | Coutts et al. |
| 7,562,348 | B1 | 7/2009 | King |
| 7,747,527 | B1 | 6/2010 | Korala |
| 7,762,455 | B2 | 7/2010 | Block et al. |
| 8,052,047 | B1 | 11/2011 | Doland et al. |
| 8,209,391 | B2 | 6/2012 | Satzke et al. |
| 8,499,071 | B2 | 7/2013 | Cipollone et al. |
| 8,606,656 | B1 | 12/2013 | Franklin et al. |
| 9,004,353 | B1 | 4/2015 | Block et al. |
| 9,172,766 | B2 * | 10/2015 | Narasimhan ............ H04L 43/00 |
| 9,355,530 | B1 | 5/2016 | Block et al. |
| 2001/0040887 | A1 | 11/2001 | Shtivelman et al. |
| 2002/0016770 | A1 | 2/2002 | Flenley et al. |
| 2002/0029256 | A1 * | 3/2002 | Zintel ..................... H04L 61/30 709/218 |
| 2002/0033416 | A1 | 3/2002 | Gerszberg et al. |
| 2002/0046109 | A1 | 4/2002 | Leonard et al. |
| 2002/0082910 | A1 | 6/2002 | Kontogouris |
| 2002/0162027 | A1 | 10/2002 | Itwaru |
| 2002/0184373 | A1 | 12/2002 | Maes |
| 2003/0040959 | A1 | 2/2003 | Fei et al. |
| 2003/0093372 | A1 | 5/2003 | Atogi et al. |
| 2003/0126084 | A1 | 7/2003 | Drummond et al. |
| 2003/0149653 | A1 | 8/2003 | Penney et al. |
| 2003/0196113 | A1 * | 10/2003 | Brown ............... H04N 21/4405 713/193 |
| 2003/0217005 | A1 | 11/2003 | Drummond et al. |
| 2003/0233477 | A1 | 12/2003 | Ballinger et al. |
| 2004/0012613 | A1 | 1/2004 | Rast |
| 2005/0004838 | A1 | 1/2005 | Perkowski et al. |
| 2005/0010475 | A1 | 1/2005 | Perkowski et al. |
| 2005/0222961 | A1 | 10/2005 | Staib et al. |
| 2005/0289535 | A1 | 12/2005 | Murray et al. |
| 2006/0037030 | A1 | 2/2006 | Kovachka-Dimitrova et al. |
| 2006/0130072 | A1 | 6/2006 | Rhoten et al. |
| 2006/0136889 | A1 | 6/2006 | Han et al. |
| 2006/0149743 | A1 | 7/2006 | Mouline et al. |
| 2006/0165060 | A1 | 7/2006 | Dua |
| 2006/0179117 | A1 | 8/2006 | Anderson et al. |
| 2006/0195816 | A1 | 8/2006 | Grandcolas et al. |
| 2006/0273151 | A1 * | 12/2006 | Block ..................... G07F 19/209 235/379 |
| 2007/0083605 | A1 | 4/2007 | Satzke et al. |
| 2007/0214454 | A1 * | 9/2007 | Edwards ............... G06F 16/958 717/176 |
| 2008/0059380 | A1 | 3/2008 | Bleahen |
| 2008/0127169 | A1 | 5/2008 | Malasky et al. |
| 2008/0154620 | A1 | 6/2008 | Glencross |
| 2008/0168187 | A1 | 7/2008 | Ranta et al. |
| 2008/0235332 | A1 | 9/2008 | McChesney et al. |
| 2009/0036217 | A1 | 2/2009 | Blackburn et al. |
| 2009/0119195 | A1 | 5/2009 | Kurczek et al. |
| 2009/0157416 | A1 | 6/2009 | Ferris et al. |
| 2009/0212104 | A1 * | 8/2009 | Smith ..................... G07F 7/04 235/379 |
| 2009/0212105 | A1 * | 8/2009 | Couper ................ G06Q 20/105 235/379 |
| 2009/0254912 | A1 | 10/2009 | Roundtree et al. |
| 2009/0287837 | A1 | 11/2009 | Felsher |
| 2010/0058353 | A1 | 3/2010 | Turski |
| 2010/0064351 | A1 * | 3/2010 | Johansson ............... H04L 67/51 726/4 |
| 2010/0161724 | A1 * | 6/2010 | Sathyan ............ H04M 1/72406 709/203 |
| 2010/0162030 | A1 | 6/2010 | Schindel et al. |
| 2010/0205594 | A1 | 8/2010 | Jirka |
| 2010/0217979 | A1 | 8/2010 | Yaghmour |
| 2010/0257539 | A1 | 10/2010 | Narayanan et al. |
| 2010/0317420 | A1 | 12/2010 | Hoffberg |
| 2011/0061000 | A1 * | 3/2011 | Andreasson ........ H04L 67/2833 715/741 |
| 2011/0078333 | A1 * | 3/2011 | Jakubowski ........ H04L 67/1095 709/248 |
| 2011/0113415 | A1 | 5/2011 | Mccurdy et al. |
| 2011/0113417 | A1 | 5/2011 | Mccurdy et al. |
| 2011/0113418 | A1 | 5/2011 | Mccurdy et al. |
| 2011/0197162 | A1 | 8/2011 | Paulik et al. |
| 2011/0209064 | A1 * | 8/2011 | Jorgensen ................ G06F 9/54 715/733 |
| 2011/0289360 | A1 | 11/2011 | Cathro |
| 2011/0296412 | A1 * | 12/2011 | Banga ................... G06F 9/5077 718/1 |
| 2012/0117005 | A1 * | 5/2012 | Spivack ................. G06F 3/0485 706/11 |
| 2012/0138677 | A1 | 6/2012 | Ma et al. |
| 2012/0179802 | A1 | 7/2012 | Narasimhan et al. |
| 2012/0185821 | A1 | 7/2012 | Yaseen et al. |
| 2012/0290428 | A1 | 11/2012 | Ben-Bassat et al. |
| 2013/0060678 | A1 | 3/2013 | Oskolkov et al. |
| 2013/0073389 | A1 | 3/2013 | Heath |
| 2013/0073473 | A1 | 3/2013 | Heath |
| 2013/0080166 | A1 | 3/2013 | Buffum et al. |
| 2013/0103686 | A1 * | 4/2013 | Sisneros ................. G06Q 50/01 707/736 |
| 2013/0117716 | A1 | 5/2013 | Stevens |
| 2013/0159891 | A1 * | 6/2013 | Farrell ................... G06F 21/128 715/762 |
| 2013/0185413 | A1 * | 7/2013 | Beaty ................... H04L 67/1001 709/224 |
| 2013/0191450 | A1 | 7/2013 | Bodenhamer et al. |
| 2013/0198012 | A1 | 8/2013 | Stimmel et al. |
| 2013/0245809 | A1 | 9/2013 | Hoeschen |
| 2013/0254383 | A1 | 9/2013 | Wray |
| 2013/0262933 | A1 | 10/2013 | Spafford et al. |
| 2013/0278622 | A1 | 10/2013 | Sun et al. |
| 2014/0040058 | A1 | 2/2014 | Aklian |
| 2014/0053107 | A1 | 2/2014 | Patel |
| 2014/0107836 | A1 | 4/2014 | Crews et al. |
| 2015/0073993 | A1 | 3/2015 | Robelo et al. |
| 2016/0275760 | A1 | 9/2016 | Block et al. |

OTHER PUBLICATIONS

International Search Report and Written Opinion in International Application No. PCT/US13/68481, Mailing date: May 5, 2014.

U.S. Appl. No. 14/071,869, filed Nov. 5, 2013 entitled "Cloud-Based Systems and Methods for Providing Consumer Financial Data".

* cited by examiner

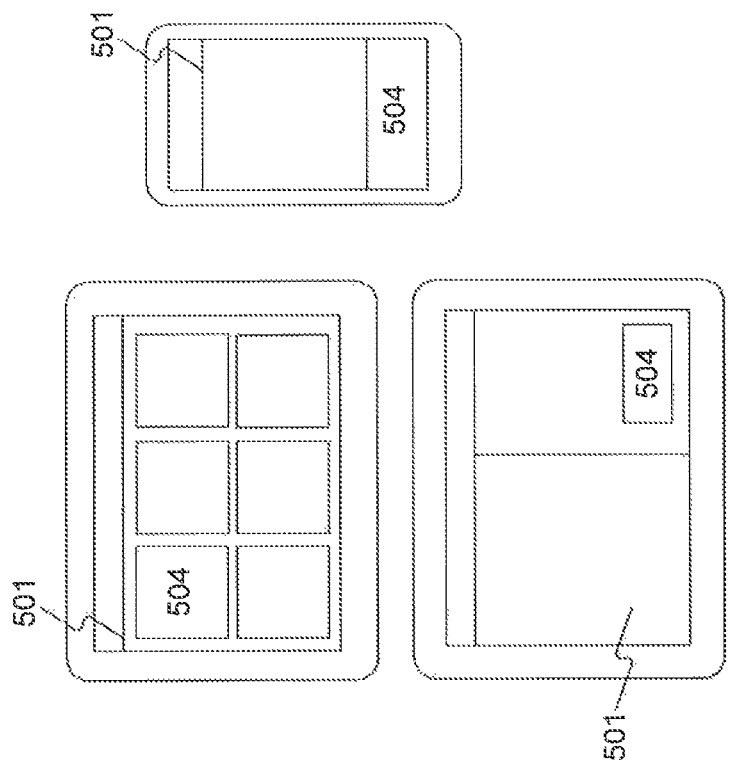
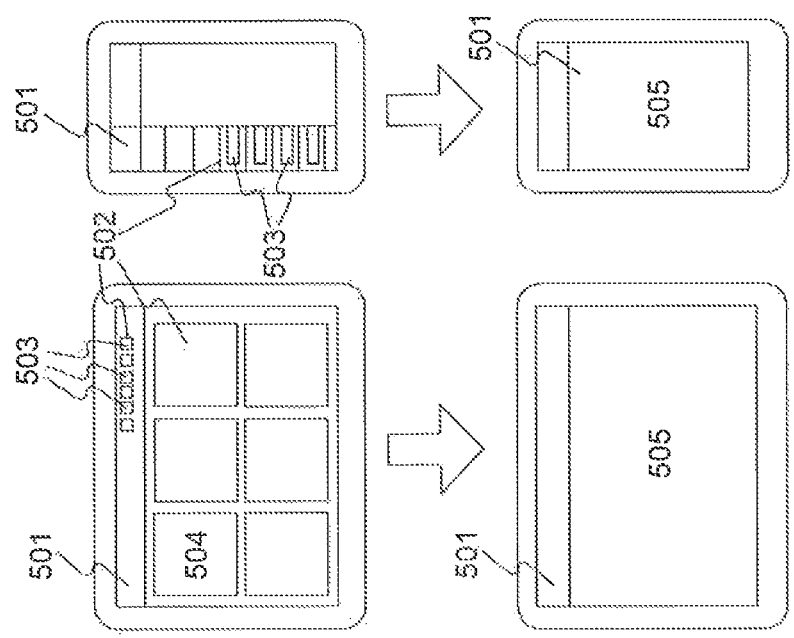

SYSTEMS AND METHODS FOR PROVIDING FINANCIAL SERVICE EXTENSIONS

CROSS REFERENCE TO RELATED APPLICATIONS

This application is a continuation of U.S. application Ser. No. 15/355,030, filed Nov. 17, 2016, (now U.S. Pat. No. 11,068,974), which is a continuation of U.S. application Ser. No. 14/072,133, filed Nov. 5, 2013, (now U.S. Pat. No. 9,514,492), which claims the benefit of priority to U.S. Provisional Application No. 61/722,626, filed Nov. 5, 2012, U.S. Provisional Application No. 61/722,939, filed Nov. 6, 2012, and U.S. Provisional Application No. 61/722,930, filed Nov. 6, 2012, the disclosures of the above applications which are expressly incorporated herein by reference to their entireties in their entirety.

The present application also relates to U.S. patent application Ser. No. 14/071,869, entitled "Cloud-Based Systems and Methods for Providing Consumer Financial Data," filed Nov. 5, 2013, which is expressly incorporated herein by reference in its entirety.

BACKGROUND

I. Technical Field

The present disclosure generally relates to financial service extensions. In particular, the present disclosure relates to systems and methods for providing financial service extensions to a cloud-based platform.

II. Background Information

Many consumers use mobile devices (such as tablets and smartphones) to access their banking and financial information. Consumers may download a banking or other financial service application to their mobile device to access various features offered by the financial service provider. The financial service application may be downloaded from a mobile software distribution platform, such as the Apple iTunes App Store and the Android Play Marketplace store. Alternatively, consumers can use web applications delivered over HTTPS, which use either server-side or client-side processing to provide a banking experience within a browser on mobile devices.

Consumers may expect financial service applications to Include various features such as account balances, recent transactions, account-related alerts, bill-payments, intra-account transfers, branch look-up services, and ATM location services. However, it may be technologically and financially burdensome for financial institutions to offer these and other services within one banking application. Using currently available banking systems and methods, financial institutions have to undertake significant development efforts to provide these and other application features and services in a manner that is compatible with various applications across multiple computing platforms.

Therefore, there is a need for improved systems and methods that overcome these problems associated with providing a financial service application.

SUMMARY

Consistent with a disclosed embodiment, a financial cloud system is provided for providing financial service extensions. The system includes a memory storing instructions and a processor configured to execute the instructions. The instructions may be executed to perform a process associated with providing the financial service extensions. The process may include providing a platform application to a client device. The process may also include receiving data associated with a financial service extension to be used in connection with the platform application. The process may further include receiving configuration data associated with the financial service extension. The process may additionally include configuring, by the processor, the financial service extension for use with the platform application. The process may also include providing, by the processor, the financial service extension to the client device.

Consistent with another disclosed embodiment, a mobile device is provided. The mobile device includes a memory storing instructions and a processor configured to execute the instructions to perform a process to provide financial service extensions. The process may include receiving data associated with a platform application. The process may also include storing, in the memory, the data associated with the platform application. The process may further include receiving data associated with a plurality of financial service extensions to be used in connection with the platform application. The process may additionally include providing the plurality of financial service extensions for use with the platform application.

Consistent with other disclosed embodiments, a non-transitory computer-readable storage media may store program instructions, which are executed by a processor and perform any of the methods described herein.

It is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIGS. 5A and 5B illustrate examples of user interfaces of an exemplary platform application, consistent with disclosed embodiments;

DETAILED DESCRIPTION

Figure 1:
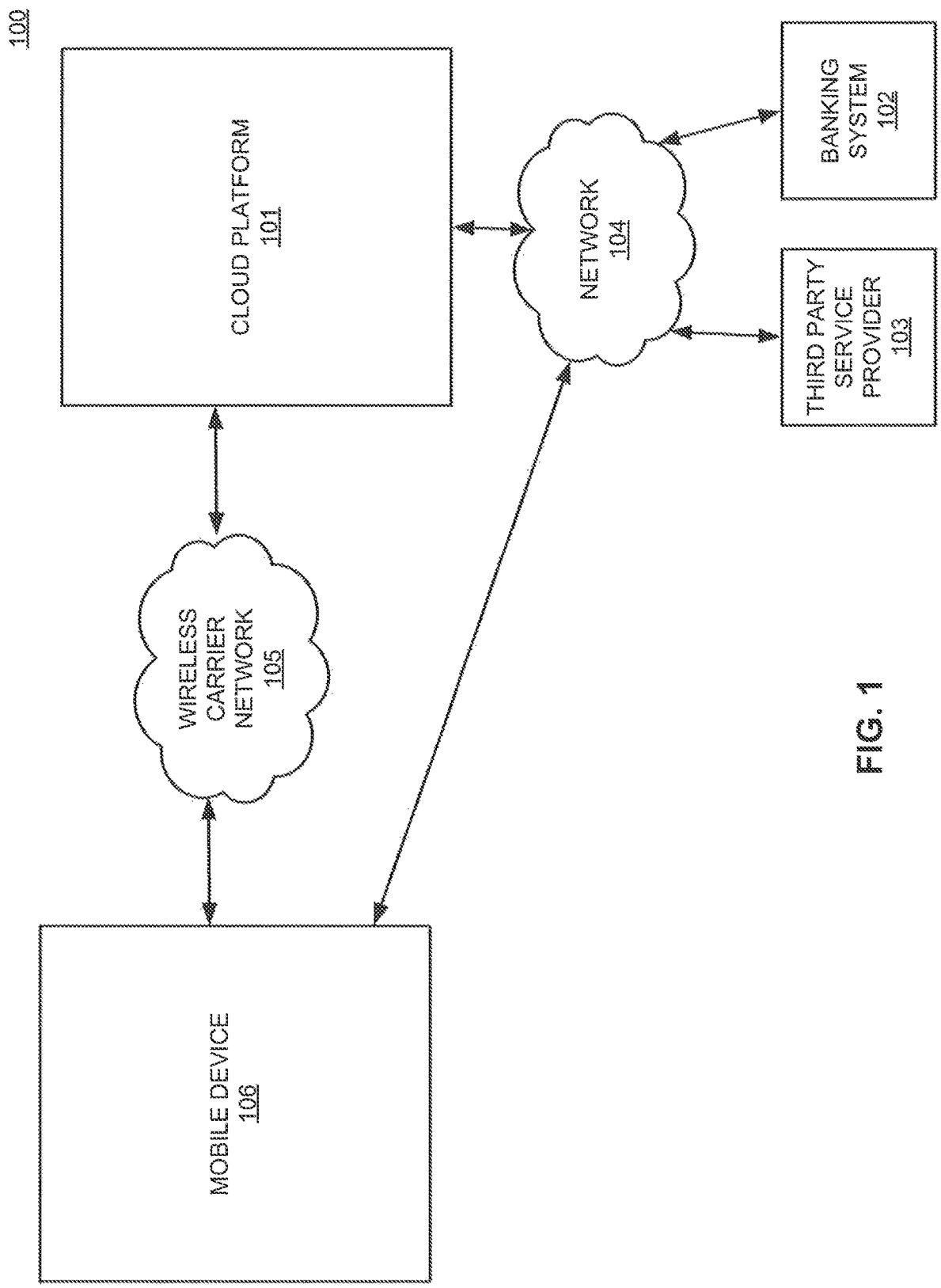
FIG. 1 is an example of a system for providing an extension to a platform application, consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limiting of the disclosed embodiments. Instead, the proper scope is defined by the appended claims.

Disclosed embodiments provide systems and methods for providing financial service extensions. The financial service extensions may be built and provided in connection with a cloud-based platform configured to deploy the financial service extensions to a mobile device. A user may access the financial service extensions through an existing mobile application configured to load the extensions. The financial service extensions may be provided and removed from the existing mobile application in a "plug-and-play" manner to allow for configuration and customization of the mobile application according to the choice of an entity providing the mobile application and/or preferences of the user.

Disclosed embodiments provide extensible mobile financial service systems and methods that enable service providers to allow one or more third-parties to provide content, services, and offers to consumers via a financial service extension. The mobile financial systems may further allow for a secure point of entry for third party content, services, and offers via the cloud-based platform, such as a mobile banking application provided by a financial institution. In this way, third party services may be integrated into a financial institution system to allow consumers to use third party services through a common application.

FIG. 1 is an example of a system 100 for providing financial services over a secure network infrastructure, consistent with a disclosed embodiment. System 100 may be configured to perform one or more software processes that, when executed, provide one or more aspects of the disclosed embodiments. The components and arrangement shown in FIG. 1 is not intended to be limiting to the disclosed embodiment as the components used to implement the processes and features disclosed here may vary.

In accordance with a disclosed embodiment, system 100 includes a cloud platform 101, a banking system 102, a third party service provider 103, and a mobile device 106 configured to communicate over a network, which may include network 104 and wireless carrier network 105. For example, mobile device 106 may communicate over wireless carrier network 105, and may also communicate over network 104 (e.g., via a Wi-Fi connection). Other components known to one of ordinary skill in the art may be included in system 100 to process, transmit, provide, and receive information consistent with the disclosed embodiments. For example, in addition to or in place of mobile device 106, one or more other client devices (e.g., desktop computer, laptop computer, etc.) may be included to communicate with the components of system 100.

Cloud platform 101 may be a computer-based system including computer system components, such as one or more servers, desktop computers, workstations, tablets, hand held computing devices, memory devices, and/or internal network(s) connecting the components. In one embodiment, cloud platform 101 may be a server that includes one or more processor(s), memory devices, and interface components configured to provide a cloud-based service. As used in this disclosure, services, processes, or applications that are "cloud-based" refer to scalable, distributed execution of one or more software processes over a network using real or virtual server hardware. Cloud platform 101 may be a single server or a distributed computer system including multiple servers or computers that interoperate to perform one or more of the processes and functionalities associated with the disclosed embodiments.

In some embodiments, cloud platform 101 may be a server that is associated with a financial institution. The financial institution may be, for example, a bank, lender, merchant, credit card provider, or any other entity that provides financial accounts to customers. The financial institution may manage cloud platform 101 such that cloud platform 101 may be used to perform financial services. In some embodiments, the financial institution may be the same institution that is associated with banking system 102. In other embodiments, the financial institution may be a different institution than that associated with banking system 102. In alterative embodiments, cloud platform 101 may be hosted and managed by an entity other than a financial institution, such as a network service provider, internet service provider, telecommunications firm, etc. These entities may execute business agreements with financial institutions enabling them to manage financial data via cloud platform 101.

Banking system 102 may be a computer-based system associated with a financial institution, such as a bank, credit union, credit card issuer, or other type of financial service entity that generates, provides, manages, and/or maintains financial service accounts. Financial service accounts may include, for example, credit card accounts, checking accounts, savings accounts, loan accounts, reward accounts, and any other types of financial service account. Financial service accounts may be associated with electronic accounts, such as a digital wallet or similar account that may be used to perform electronic transactions, such as purchasing goods and/or services online. Financial service accounts may also be associated with physical financial service account cards, such as a credit or check card that a user may carry on their person and use to perform financial service transactions, such as purchasing goods and/or services at a point of sale (POS) terminal. Banking system 102 may include infrastructure and components that are configured to generate and provide financial service accounts and financial service account cards (e.g., credit cards, check cards, etc.). Banking system 102 may also include infrastructures and components that are configured to store financial data associated with the financial service accounts.

In embodiments in which cloud platform 101 is also associated with a financial institution, banking system 102 may be associated with the same or a different financial institution. In certain embodiments in which cloud platform 101 and banking system 102 are associated with the same financial institution, cloud platform 101 may be an integrated component of banking system 102. For example, banking system 102 may be an overall computing system associated with a financial institution, with cloud platform 101 being a component thereof.

Third party service provider 103 may be a computer-based system associated with a third party. For example, third party service provider 103 may be associated with a merchant configured to provide one or more services to consumers. Third party service provider 103 may include one or more computing systems that are configured to perform computer-implemented processes, such as a server, desktop, laptop, mobile device, etc.

Banking system 102 and third party service provider 103 may be configured to communicate with cloud platform 101 via network 104. Network 104 may be any type of network that provides communications, exchanges information, and/or facilitates the exchange of information between cloud platform 101 and other components of system 100, such as banking system 102, third party service provider 103, and/or mobile device 106. In one embodiment, network 104 may be the Internet, or any other suitable connection(s) that enables system 100 to send and receive information between the components of system 100. In other embodiments, one or more components of system 100 may communicate directly through a dedicated communication link(s) (not shown), such as a link between cloud platform 101 and banking system 102.

In some embodiments, cloud platform 101 may communicate with banking system 102 and/or third party service provider 103 through one or more application programming interfaces (APIs). The one or more APIs may be configured to allow for the transmission and receipt of data between components, according to one or more processes associated with the provision of a particular service. For example, a peer-to-peer (P2P) transfer API between cloud platform 101 and third party service provider 103 may allow for sharing and processing of particular data associated with completion of a P2P transfer, such as a transfer of money from one consumer's account to another consumer's account.

Mobile device 106 may be a client device in the form of one or more mobile, computer-based systems. For example, mobile device 106 may be a tablet or smartphone. In alternative embodiments, another client device, such as a desktop, laptop computer, server, point of sale device, kiosk, ATM, or the like, may be included in system 100 in place of or in addition to mobile device 106 and perform some or all of the functions of mobile device 106. In an exemplary embodiment, mobile device 106 may be associated with a consumer that maintains one or more financial accounts with a financial institution associated with cloud platform 101, banking system 102, and/or third party service provider 103.

In an exemplary embodiment, mobile device 106 may be a device that receives, stores, and/or executes mobile applications. Mobile device 106 may be configured with storage that stores one or more operating systems that perform known operating system functions when executed by one or more processors, such as one or more software processes configured to be executed to run a mobile application.

Mobile device 106 may also include communication software that, when executed by a processor, provides communications with network 104 and wireless carrier network 105, such as Web browser software, tablet or smart hand held device networking software, etc. In some embodiments, mobile device 106 may be configured to communicate with banking system 102 and/or third party service provider 103 via network 104 and/or wireless carrier network 105. In these embodiments, banking system 102 and/or third party service provider 103 may be authorized to execute one or more software processes on mobile device 106 via network 104 and/or wireless carrier network 105, such as a mobile application or a web applet. Wireless carrier network 105 may be a data service network configured to provide communications, exchange information, and/or facilitate the exchange of information between components of system 100. It should be understood, however, that wireless carrier network 105 may be any network configured to perform these functions. In certain embodiments, wireless carrier network 105 and network 104 may be the same or otherwise related networks.

In an exemplary embodiment, system 100 may use infrastructures and components, such as banking system 102 and third party service provider 103 and integrate them into cloud platform 101, which becomes a point of entry, and facilitates the integration of banking and third party services such that they are made available to mobile device 106 through communication with cloud platform 101.

Figure 2:
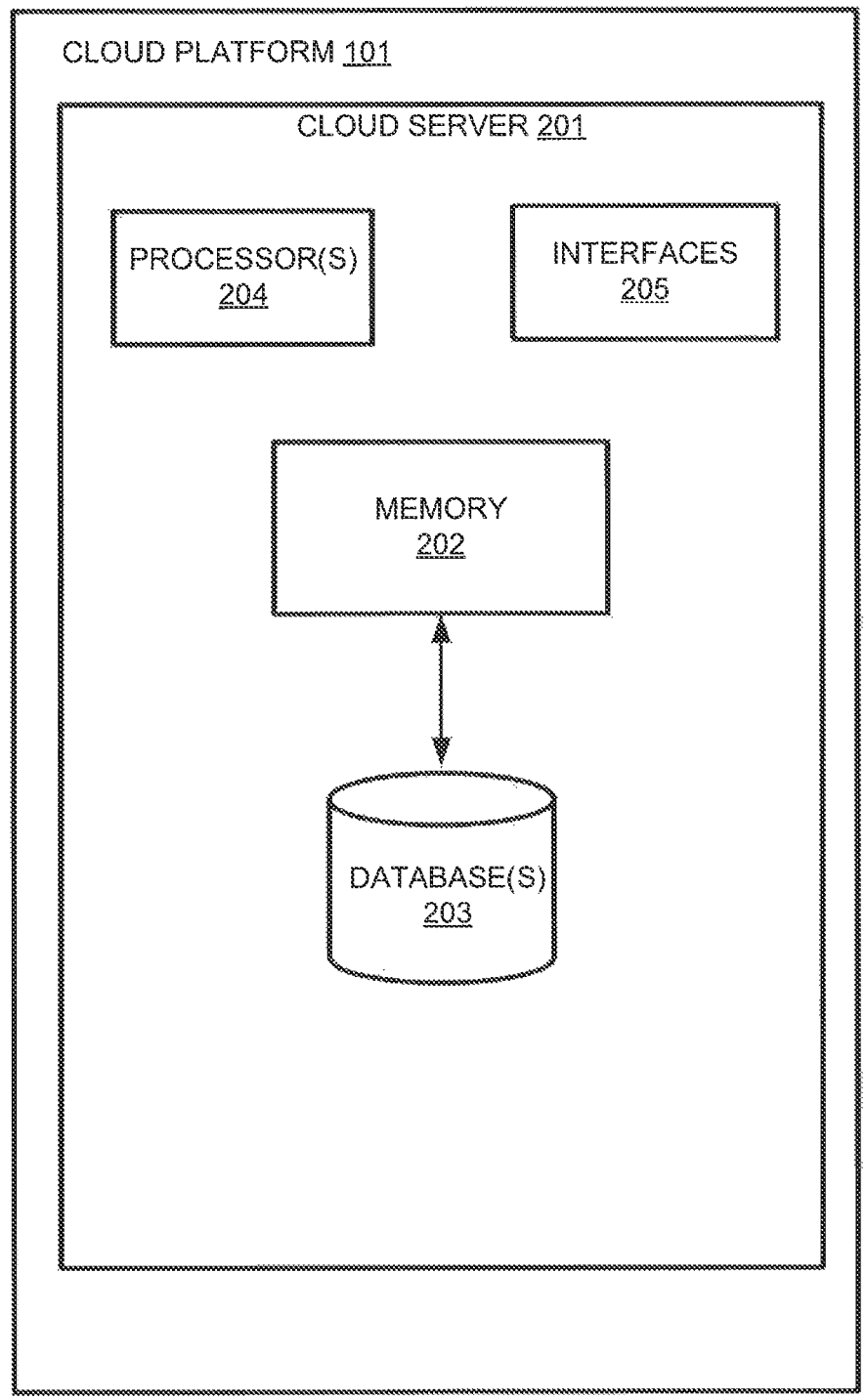
FIG. 2 is an example of a cloud platform that may be used in conjunction with the system of FIG. 1, consistent with disclosed embodiments.

FIG. 2 further depicts cloud platform 101. Cloud platform 101 may include a cloud server 201. Cloud server 201 may include one or more memories 202, one or more databases 203, one or more processors 204, and one or more interfaces 205. Cloud server 201 may take the form of a general purpose computer, a mainframe computer, a mobile computing device, or any combination of these components. According to some embodiments, cloud server 201 may include a web server or similar computing device that generates, maintains, and provides one or more web sites or similar services, consistent with disclosed embodiments. Cloud server 201 may be standalone, or it may be part of a subsystem, which may be part of a larger system. For example, cloud server 201 may represent distributed servers that are remotely located and communicate over a network (e.g., network 104) or a dedicated network, such as a LAN. In some embodiments, one or more of banking system 102, third party service provider 103, and mobile device 106 may include the components and/or configuration of cloud platform 101 and/or cloud server 201. It should be understood that the illustrated system architecture described herein associated with cloud platform 101 is presented as a non-limiting example only, and that any other system configuration operable to perform the disclosed embodiments is possible.

Memory 202 may include one or more storage devices configured to store instructions used by processor 204 to perform functions related to disclosed embodiments. For example, memory 202 may be configured with one or more software instructions that may perform one or more operations when executed by processor 204. The disclosed embodiments are not limited to separate programs or computers configured to perform dedicated tasks. For example, memory 202 may include a single program that performs the functions of server 201 or a program could comprise multiple programs. Additionally, processor 204 may execute one or more programs located remotely from cloud server 201. For example, banking system 102, third party service provider 103, and/or mobile device 106 may, via cloud server 201, access one or more remote programs that, when executed, perform functions related to certain disclosed embodiments. Memory 202 may also store data that may reflect any type of information in any format that the system may use to perform operations consistent with the disclosed embodiments.

Cloud server 201 may be communicatively connected to database(s) 203 (e.g., via network 104) or database 203 may be an integrated component of cloud platform 101 and/or cloud server 201. Database 203 may include one or more memory devices that store information and are accessed and/or managed through cloud server 201. By way of example, database(s) 203 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Database 203 may include computing components (e.g., database management system, database server, etc.) configured to receive and process requests for data stored in memory devices of database(s) 203 and to provide data from database(s) 203.

Processor(s) 204 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in cloud server 201.

Interfaces 205 may be one or more devices configured to allow data to be received and/or transmitted by cloud server 201. Interfaces 205 may include one or more digital and/or analog communication devices that allow cloud server 201 to communicate with other machines and devices, such as other components of system 100.

Figure 3:
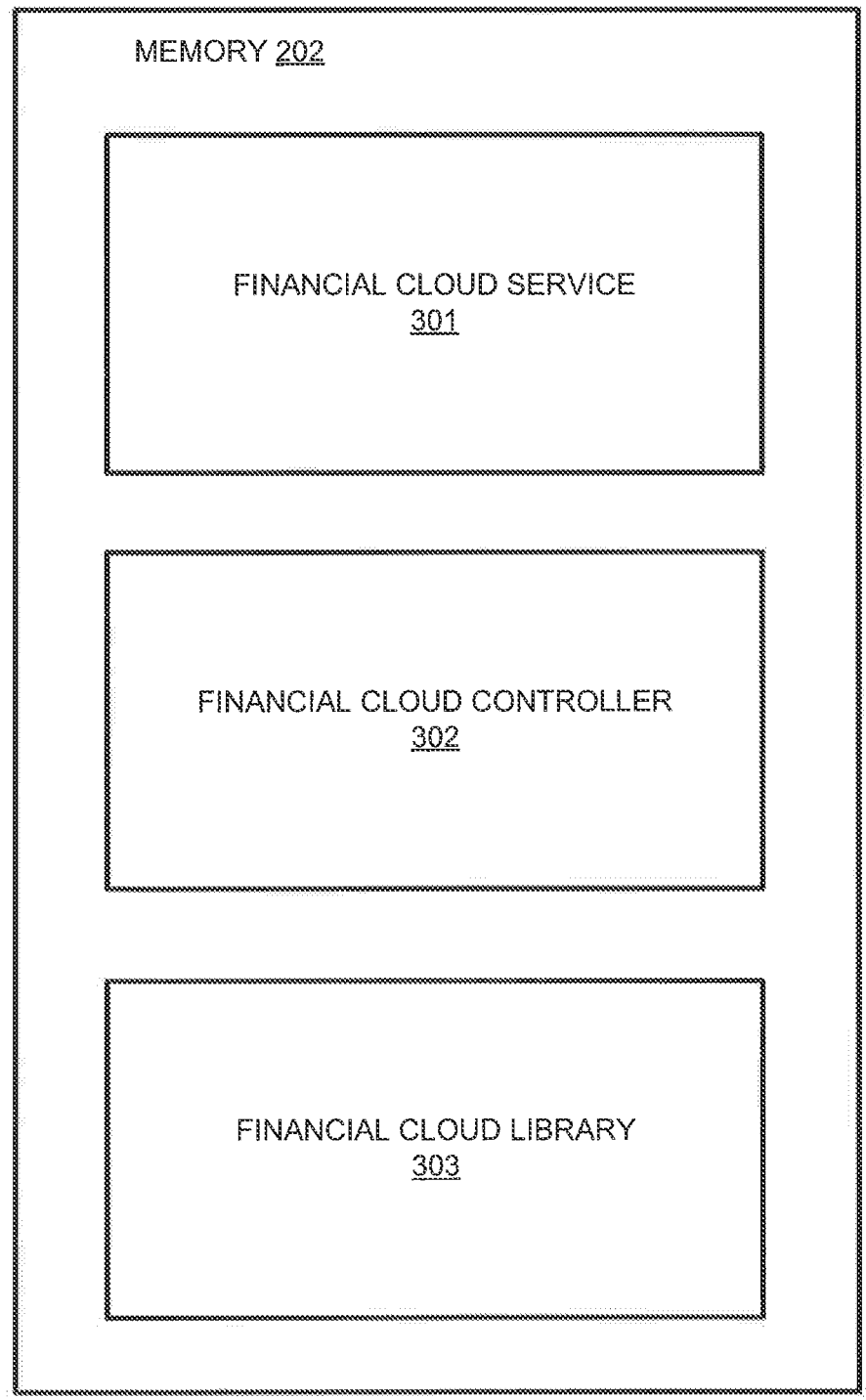
FIG. 3 is an example of a memory that may be used in conjunction with the cloud platform of FIG. 2, consistent with disclosed embodiments.

FIG. 3 depicts memory 202 of cloud server 201. In one embodiment, memory 202 may include at least one financial cloud service 301, at least one financial cloud controller 302, and at least one financial cloud library 303. Each financial cloud service 301, financial cloud controller 302, and financial cloud library 303 may be a program including software instructions configured to perform one or more processes when executed by processor 204.

Financial cloud service(s) 301 may be configured to facilitate communication between cloud server 201 and one or more of banking system 102, third party service provider 103, and mobile device 106. After receiving a request from one of these components, cloud server 201 may determine which financial cloud service 301 may be associated with the particular request. For example, cloud server 201 may receive a request for account Information from mobile device 106, which cloud server 201 may route to the appropriate financial cloud service 301 (i.e., a financial cloud service 301 associated with retrieving account information). In another example, cloud server 201 may receive a request to process a third party service (e.g., a P2P transfer), which cloud server 201 may route to a financial cloud service 301 configured to gather data from the request and communicate with the appropriate third party service provider 103 (e.g., via an API) to complete the request.

Financial cloud controller 302 may be configured to provide a layer of security to cloud service 201. Financial cloud controller 302 may include software that, when executed by processor 204, performs one or more security processes. The one or more security processes may be configured to authorize requests routed through financial cloud service 301. For example, financial cloud controller 302 may include a token authorization process configured to authenticate a data request before processing the request. If financial cloud controller 302 determines that a request is not authorized (e.g., a token is not received or cannot be authenticated), a service request (e.g., a request for account information) may be denied.

Financial cloud library 303 may be one or more components configured to store data locally on cloud server 201. For example, financial cloud library 303 may store consumer account information, such as financial account information. The financial account information may be received from banking system 102 and authorized to be stored locally. In this way, financial cloud library 303 may allow financial account information to be readily available within cloud server 201.

In one example, financial cloud service 301 may be used to respond to a request from mobile device 106 for financial account information (e.g., account number, account balance, recent transactions, etc.). Financial cloud service 301 may make a request to an appropriate financial cloud library 303 for the financial account information. Financial cloud controller 302 may determine if the financial cloud service 301 is authorized to receive the account information, and if so, transfer the account information from financial cloud library 303 to financial cloud service 301 for eventual transmission to mobile device 106.

Figure 4:
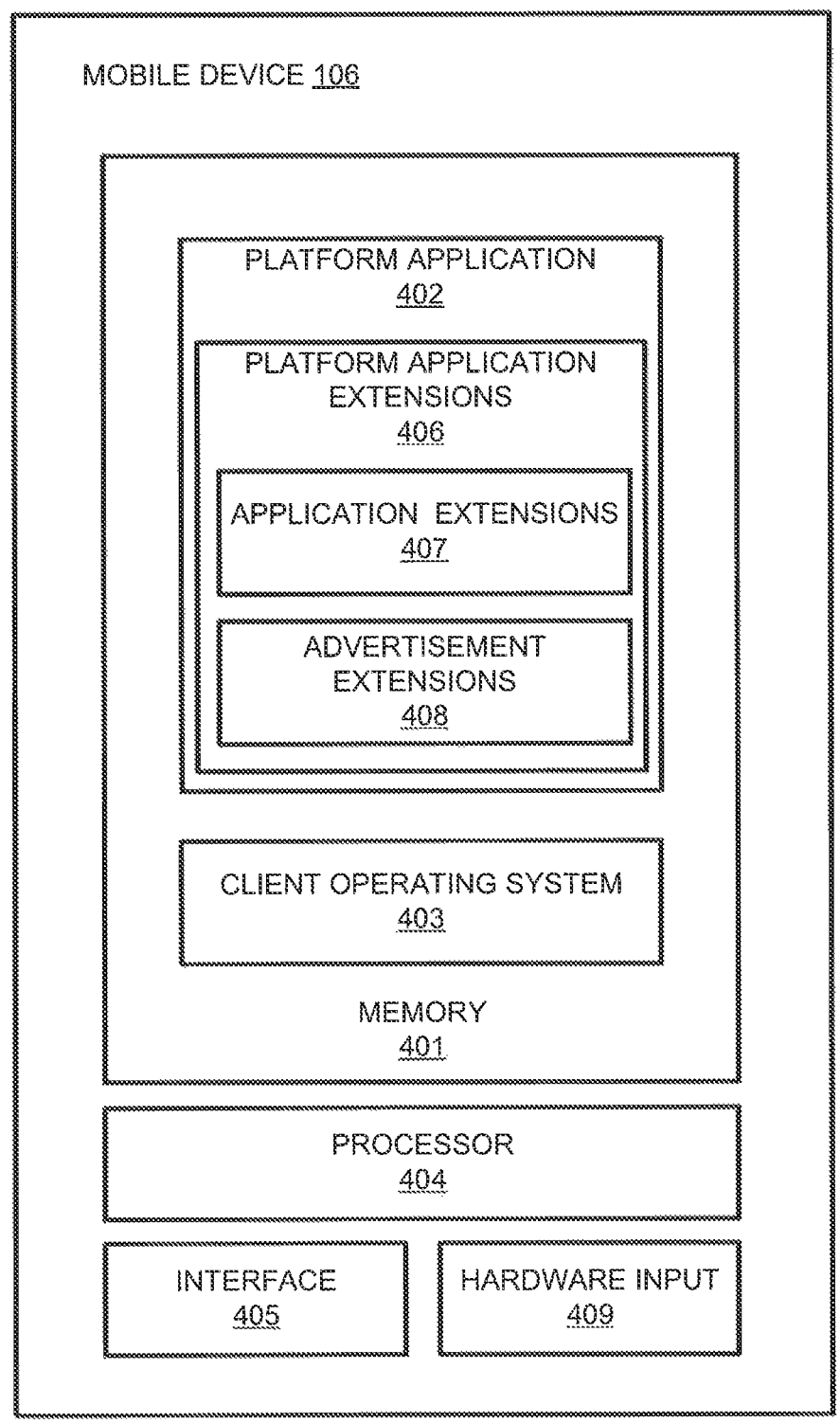
FIG. 4 is an example of a mobile device that may be used in conjunction with the system of FIG. 1, consistent with disclosed embodiments.

FIG. 4 depicts mobile device 106. Mobile device 106 may include at least one memory 401, at least one processor 404, at least one interface 405, and at least one hardware input 409. Memory 401 may include a platform application 402 and a mobile operating system 403. Mobile operating system 403 may be configured to cause processor 404 to execute instructions to perform various processes associated with use of mobile device 106. For example, mobile operating system 403 may be configured to cause mobile device 106 (e.g., processor 404) to run one or more programs, such as a mobile application and/or web browser. Exemplary client operating systems 403 may include Apple iOS and Android operating systems. In an exemplary embodiment, processor 404 may execute instructions from mobile operating system 403 to run platform application 402. While depicted and described as mobile device 106 it should be understood that, in alternative embodiments, mobile device 106 may be another client device, such as a laptop or desktop computer, server, point of sale device, kiosk, ATM, or the like.

Interface 405 may include one or more devices configured to allow data to be received and/or transmitted by mobile device 106. For example, interface 405 may include a user interface, such as a display, configured to present data to a user. Interface 405 may also include an input device, such as a keyboard or touchscreen, configured to receive input data from a user. Interface 405 may also include a component configured to connect mobile device 106 to mobile carrier network 105.

In an exemplary embodiment, platform application 402 may be a web-based mobile application configured to be used in connection with cloud platform 101. It should be understood, however, that platform application 402 is not necessarily a mobile application, and could be instead by another web-based service, such as a web page available on mobile device 106 or another client device, such as a laptop or desktop computer. In any instance, platform application 402 may originate from cloud platform 101 and cloud server 201 and be provided to mobile device 106 (e.g., downloaded over wireless carrier network 105).

In an exemplary embodiment, platform application 402 may be configured as a financial Institution (e.g., banking) application. Platform application 402 may be configured to provide financial services to a consumer via hosting of one or more extensions 406. Extensions 406 may include one or more programs configured to be executed by processor 404 to make one or more services available within platform application 402. Extensions 406 may be pluggable software components configured to be loaded for use within platform application 402. For example, extensions 406 may be "plug-and-play" services that may be deployed over the air (e.g., via wireless carrier network 105) and accessed via platform application 402 with immediate availability. In this way, extensions 406 may be provided to mobile device 106 and platform application 402 in real-time, without updating of the platform application 402. Similarly, extensions 406 may be removed or deactivated (i.e., unplugged) such that they are no longer accessible via platform application 402.

Extensions 406 may include application extensions 407 and advertisement extensions 408. Application extensions 407 may be associated with one or more services that may be integrated into platform application 402 and made available to a consumer associated with mobile device 106. Each application extension 407 may be an application or other software service configured to run within platform application 402 and configured to communicate with cloud server 201 (e.g., via a mobile device-cloud API). Cloud server 201 may be configured to receive requests from application extension 407, and to process those requests, in conjunction with banking system 102 and/or third party service provider 103, if necessary.

In an exemplary embodiment, each application extension 407 may be associated with a financial service. For example, application extensions 407 may include applications associated with P2P payments and/or gift card purchase services. Advertisement extensions 408 may be programs that, when executed by processor 404, are configured to provide one or more advertisements, offers, or other content to mobile device 106. As with application extensions 407, advertisement extensions 408 may be configured to run within platform application 402. In this way, applications, advertisements, offers, and other content may be provided to a user of mobile device 106 within a single mobile application.

In some embodiments, application extensions 407 and advertisement extensions 408 may be configured to communicate with one or more hardware inputs 409. Hardware inputs 409 may include components of mobile device 106 configured to provide particular data. For example, hardware input 409 may include a GPS device configured to provide a location of mobile device 106 to an application extension 407 or advertisement extension 408 as input data. In this way, particularized use of an extension 406 may be possible, such as to provide a relevant financial service (e.g., map of nearby branch locations) or relevant advertisement (e.g., associated with nearby merchants).

Platform application 402 may be provided with any combination and amount of extensions 406, including application extensions 407, advertisement extensions 408, and/or any other type of extensions 406. The extensions 406 may be configured by cloud platform 101 and selectively deployed to mobile device 106 for access via platform application 402. Identification of the extensions 406 that are to be deployed and plugged-in to platform application 402 may be determined by an entity that provides platform application 402 (e.g., a financial institution), a user (e.g., the consumer), and/or a third party.

FIGS. 5A and 5B depict examples of display configurations of mobile device 106 associated with platform application 402 and extensions 406. Each mobile device 106 may include a user interface 501 configured to be displayed to a user by a display device (e.g., a touchscreen). User interfaces 501 may include a plurality of extensible regions 502 within a navigation interface. Extensible regions 502 may be containers within the platform application 402 in which extensions 406 may be presented and executed. Extensible regions 502 may include Icon regions 503 and tile regions 504. Additional extensible regions 505 may be caused to be displayed after selection of an icon region 503 and/or tile region 504. Extensible regions 505 may also include icon regions 503 and/or tile regions 504 that may be selected for further iterations and functionality of extensions 406.

As shown in FIG. 5A, one or more icon regions 503 may be displayed in a navigation region of the user interface 501 (e.g., across the top of the display). Each icon region 503 may display one or more icons representing a discrete application extension 407. If an icon/icon region 503 is selected, the associated application extension 407 may be opened. For example, instructions associated with the application extension 407 may be executed, causing the user interface 501 to change, and the application extension 407 to be displayed in another extensible region 505 (e.g., a full-screen extensible region), as indicated by the arrows in FIG. 5A.

In addition or alternatively, one or more tile regions 504 may display an application extension 407. Tile regions 504 may display the application extension 407 within the tile region 504 throughout use of the extension 406, and/or may cause user interface 501 to change to display another extensible region 505, as shown in FIG. 5A.

As shown in FIG. 5B, extensible regions 502 may include one or more tile regions 504 displayed in any portion of a user interface 501. Each tile region 504 may be configured to display an advertisement extension 408 to provide an advertisement, offer, or other content to the consumer. If a tile region 504 is selected, the associated advertisement, offer, or other content may cause processor 404 to execute software instructions to provide an appropriate response to the selection. For example, selection of a tile region 504 containing an advertisement extension 408 may result in the launching of a web browsing session, solicitation of customer contact information, or display of a video for consumption by the consumer.

The arrangement of extensible regions 502 within the user interface 501 of the platform application 402 may be determined by an entity associated with cloud platform 101. Further, the entity may determine which application extensions 407 and advertisement extensions 408 to provide to platform application 402. In the embodiments in which cloud platform 101 and cloud server 201 are associated with a financial institution, each extensible region 502, 505 of the platform application 402 may be configured to provide a particular financial service (e.g., via an application extension 407) and/or a particular financial advertisement (e.g., via an advertisement extension 408). In this way, platform application 402 may be a financial service application configured to provide various financial services, advertisements, offers, and other content through the financial institution and any associated banking systems 102 and/or third party service providers 103. The financial institution may customize the financial service application through selection of the application extensions 407 and advertisement extensions 408 to be made available in the extensible regions 502, 505 of a user interface 501 associated with platform application 402.

Figure 6:
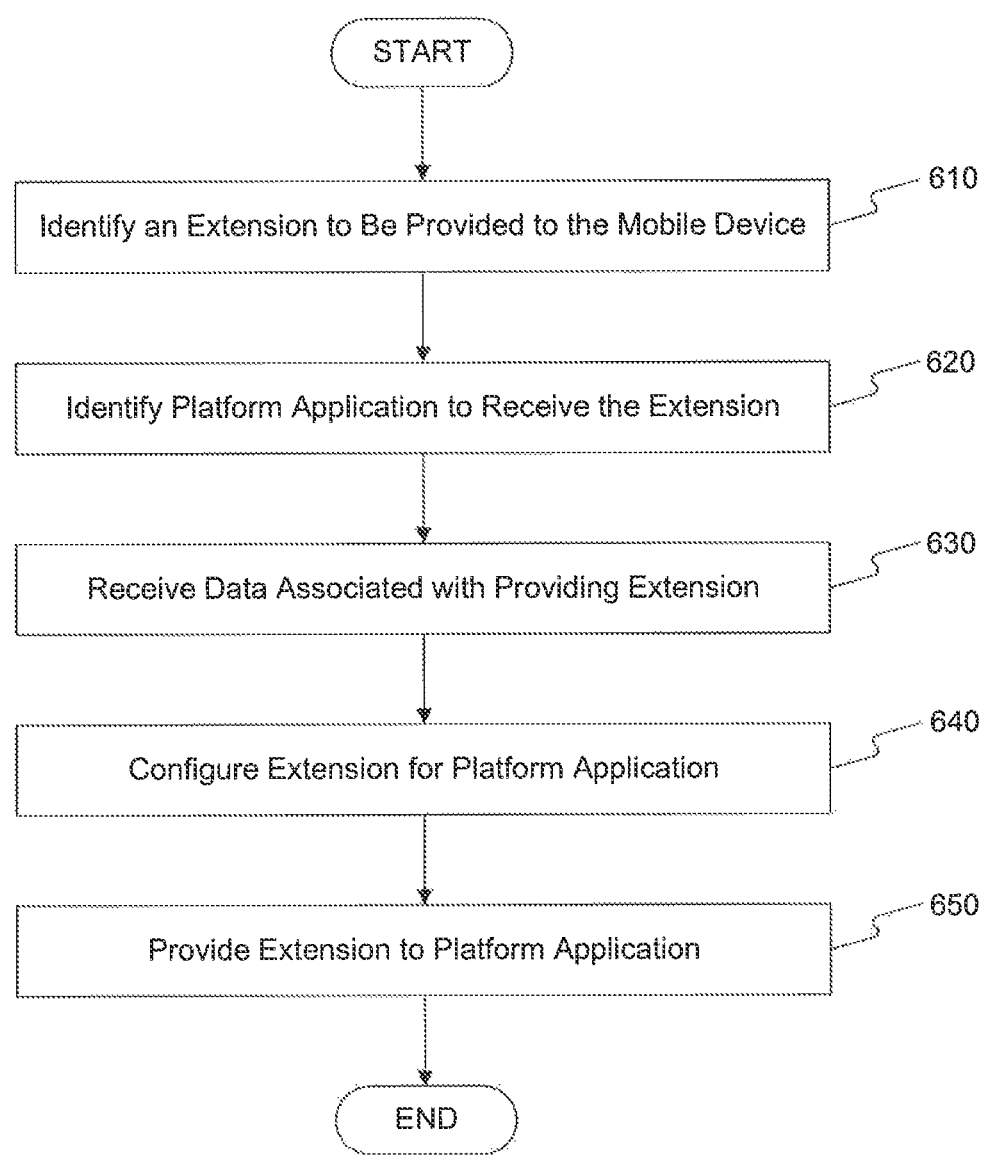
FIG. 6 is a flowchart of an example of a process for providing an extension to a platform application, consistent with disclosed embodiments.

FIG. 6 is flowchart of a process 600 for providing an extension 406 to a platform application 402, consistent with disclosed embodiments. In certain embodiments, cloud server 201 may execute software instructions to perform process 600 to provide one or more extensions 406 to platform application 402. In one embodiment, platform application 402 may be installed on mobile device 106 prior to provision of one or more of extensions 406. However, it should be understood that platform application 402 and one or more of extensions 406 may be provided to mobile device 106 at substantially the same time (e.g., platform application 402 downloaded and installed with one or more of extensions 406 pre-loaded and available).

Cloud server 201 may receive data identifying one or more of extensions 406 to be provided to a platform application 402 (step 610). The received data may include an indication of selection a particular one or more of extensions 406 by a user. For example, a user associated with a financial institution may select one of extensions 406 to be available through a platform application 402 associated with the financial institution, and input data to identify the extension 406. The selected extension 406 may be an application extension 407 configured to provide a third party service through a particular third party service provider 103 (e.g., P2P transfers) or an advertisement extension 408 configured to provide an advertisement, offer, or other content (e.g., a savings deal associated with a merchant). The received data may Identify the particular type of extension 406.

Cloud server 201 may also receive data identifying the platform application(s) 402 that may receive the identified extension 406 (step 620). For example, a selected extension 406 may be intended to be provided to a platform application 402 associated with a particular financial institution. The received data may identify the platform application(s) associated with that financial institution. Further, the received data may identify platform applications 402 associated with particular users or categories of users. For example, one of extensions 406 may be intended to be provided to users enrolled in a particular rewards program, users in a particular area, users of a particular age, etc. Server 201 may receive data and execute software instructions to determine a set of platform applications 402 (and/or mobile devices 106) to be provided with the extension 406. For example, a financial cloud service 301 may generate a request to search a financial cloud library 303 for particular users associated with the received identifying information.

Cloud server 201 may also receive data associated with providing the extension 406 to a selected platform application 402 (step 630). The data associated with providing the extension 406 may include data configured to initialize the platform application extension 406 for use with the components of system 100. For example, cloud server 201 may receive a financial cloud service 301 associated with the extension 406 and configured to manage performance of processes associated with the extension 406. In another example, cloud server 201 may receive data identifying one or more existing financial cloud services 301 configured to manage extension 406.

The received initialization data may also include information identifying a banking system 102 and/or third party service provider 103 associated with the extension 406. The data may include communication channels that may be used to transmit data between the identified banking system 102 and/or third party service provider 103 and cloud server 201. For example, the initialization data may identify a particular banking system API or third party service API that may be used to perform processes associated with the extension 406. Cloud server 201 may receive and store software instructions that, when executed, allow for communication via the identified API. The instructions may be stored as part of a financial cloud service 301 associated with the extension 406.

In certain aspects, the received data associated with providing the extension 406 may be programs and protocol configured to allow the extension 406 to function when called upon (e.g., used) by a user. In addition to setting up the appropriate functionality, cloud server 201 may also configure the extension 406 for use within the platform application 402 (step 640). For example, cloud server 201 may receive configuration data from one or more sources (e.g., users). The configuration data may include software instructions configured to match the extension 406 to a particular aspect of mobile device 106 and/or platform application 402. For example, configuration data may include display data, including a particular extensible region 502 to receive an icon 503 or tile 505 for presentation of the extension 406, as well as an extensible region 505 for display of the extension 406 after selection by a user of mobile device 106. The configuration data may also include information specific to mobile device 106, such as display DPI, display height and width, extensible region height and width, model of mobile device 106, mobile operating system 403, and user-identifying information. The configuration data may allow for appropriate presentation and use of the extension 406 with the platform application 402.

Based on the received initialization data (step 630) and configuration data (step 640), cloud server 201 may provide the extension 406 to the platform application 402 (step 650). This may be done by cloud server 201 receiving (e.g., from a user) or transmitting (e.g., to mobile device 106) an enabling instruction configured to allow for the communication of data associated with the extension 406 across system 100. For example, cloud server 201 may provide configuration data to mobile device 106, which may execute software instructions to display the extension 406 within platform application 402. Mobile device 106 may store these and additional instructions configured to provide functionality to the extension 406 such that it may be used by a consumer. Similarly, communication between cloud server 201 and banking system 102 and/or financial service provide 103 may be enabled.

Figure 7:
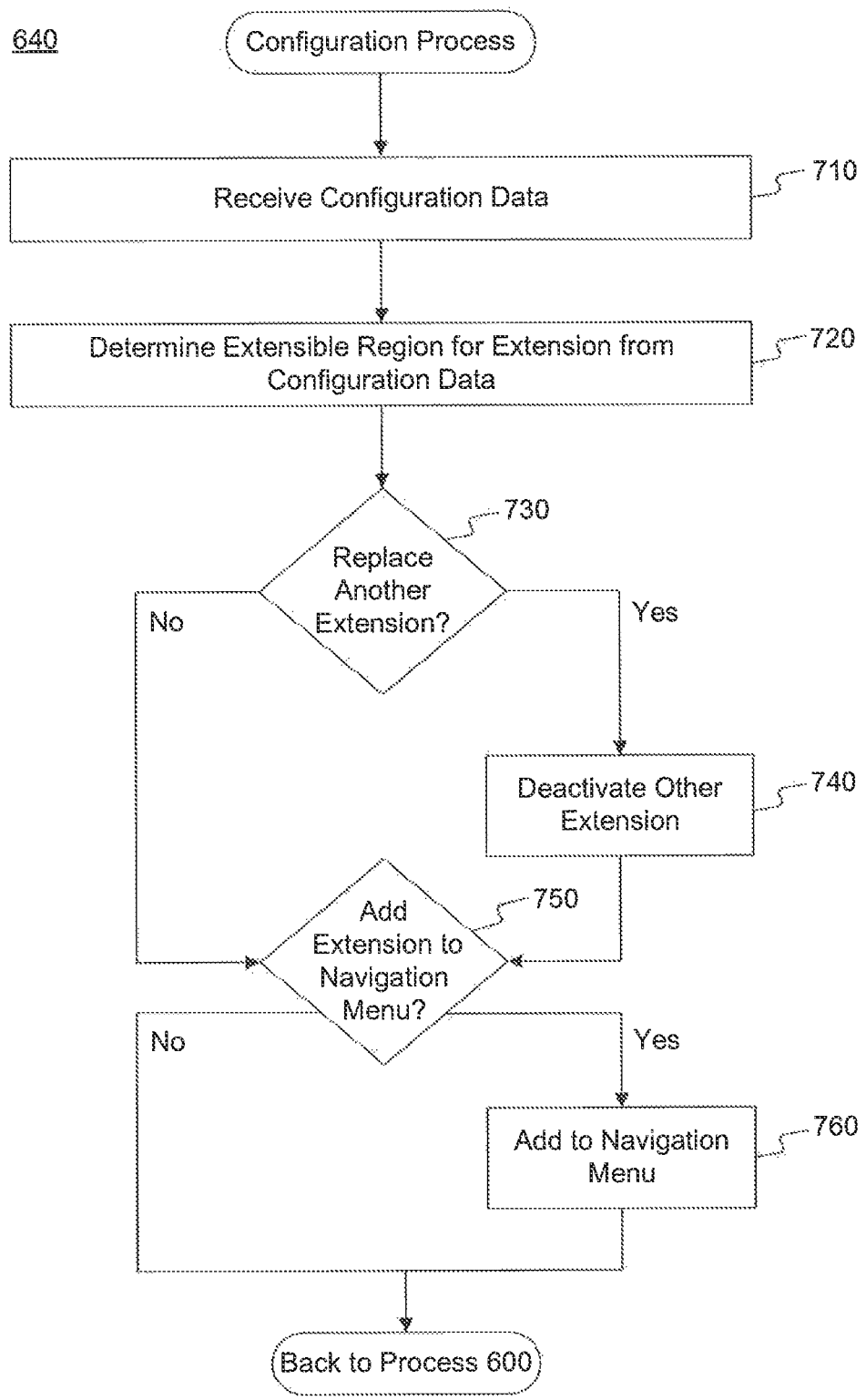
FIG. 7 is a flowchart of an example of an extension configuration process, consistent with disclosed embodiments.

FIG. 7 is a flowchart of a configuration process associated with configuration of one of extensions 406 for a platform application 402. The configuration process may be an embodiment of step 640 of process 600. As described above, the configuration process may allow for integration of an extension 406 within platform application 402, including the manner in which the extension 406 may be presented to a consumer.

To perform to the exemplary configuration process, cloud server 201 may receive configuration data (step 710). The configuration data may be provided based at least in part on a selection by a user. For example, the configuration of the platform application and extension 406 may be chosen by an entity associated with cloud server 201 (e.g., a financial institution). The data configuration may allow the entity to provide the extension 406 to a consumer in a customized manner. For example, the configuration data may include the enabling of an extension 406 in favor of another extension 406 that was previously available. In another example, the configuration data may include other customization aspects, such as what to display to a user (e.g., a user interface). In other embodiments, the configuration data may be received from mobile device 106 after being input by a consumer-user of mobile device 106. For example, the consumer may choose which extensions 406 the consumer wants to be available within platform application 402, which may be transmitted and received by cloud server 201 as configuration data.

As has been described, the configuration data may include data associated with the integration of the extension 406 into platform application 402. Based on the received configuration data, cloud server 201 may determine an extensible region 502 and/or 505 of the platform application 403 for containing the extension 406 (step 720).

In one embodiment, the extension 406 may be an application extension 407. The configuration data may include an extensible region 502 for display of an icon within associated with the application extension 407 (e.g., an icon region 503). The extensible region 502 may be associated with instructions such that when extensible region 502 is selected by a user, the application extension 407 may be caused to run within another extensible region, such as an extensible region 505 (e.g., full-screen). In another example, the configuration data may include an extensible region 502 as a tile region 504 for display of the application extension 407.

In another example, the extension 406 may be an advertisement extension 408. The configuration data may include a tile region 504 as an extensible region 502 for display of the advertisement extension 408, as well as a particular result process to be performed if the tile region 504 is selected (e.g., redirect mobile device 106 to a web page associated with the advertisement extension 408).

The configuration data may also include an indication of whether the extension 406 replaces another extension 406, which may be determined by cloud server 201 (step 730). For example, a particular extensible region 502, such as a tile region 504 of a navigation screen, may be configured to display and run one extension 406. In order to customize the platform application, the extension 406 associated with that particular tile region 504 may be switched with other extensions 406. In such an instance, the configuration data may include an instruction to deactivate another extension 406 (step 740). Deactivation of another extension 406 may include execution of software instructions to remove the extension 406 from the extensible region 502, which may include removal of all data associated with the extension 406, an instruction to prevent display of the extension 406, or some other deactivation process.

The configuration data may additionally or alternatively include an indication of whether a navigation feature is to be included in an extensible region 502 (step 750). For example, the configuration data may include an indication of an icon region 503 to be used for display of an icon associated with the extension 406. If such a feature is to be included, the configuration data may include instructions for adding the feature to an appropriate icon region 503 (step 760). It should be understood that the configuration data may also include an indication that an existing feature in an icon region 503 may be replaced by the feature of the extension 406 being configured for the platform application 402. In such an instance, the feature and extension 406 being replaced may be deactivated or configured for movement to another extensible region 502. Further, it should be understood that other features, which may not necessarily be navigation features, may be added to an extensible region 502 using the same or similar processing.

The configuration process depicted in FIG. 7 may allow one or more of extensions 406 to be prepared for deployment to platform application 402. The configuration process may also allow for on-the-fly customization of a platform application 402, since existing extensions 406 may be deactivated in favor of a different extension 406. In this way, particular services associated with application extensions 407 and advertisements and/or offers associated with advertisement extensions 408 may be changed as desired. It should be understood, however, that the configuration process depicted in FIG. 7 is an example and that other processes and/or other steps may be included in configuring an extension 406.

Figure 8:
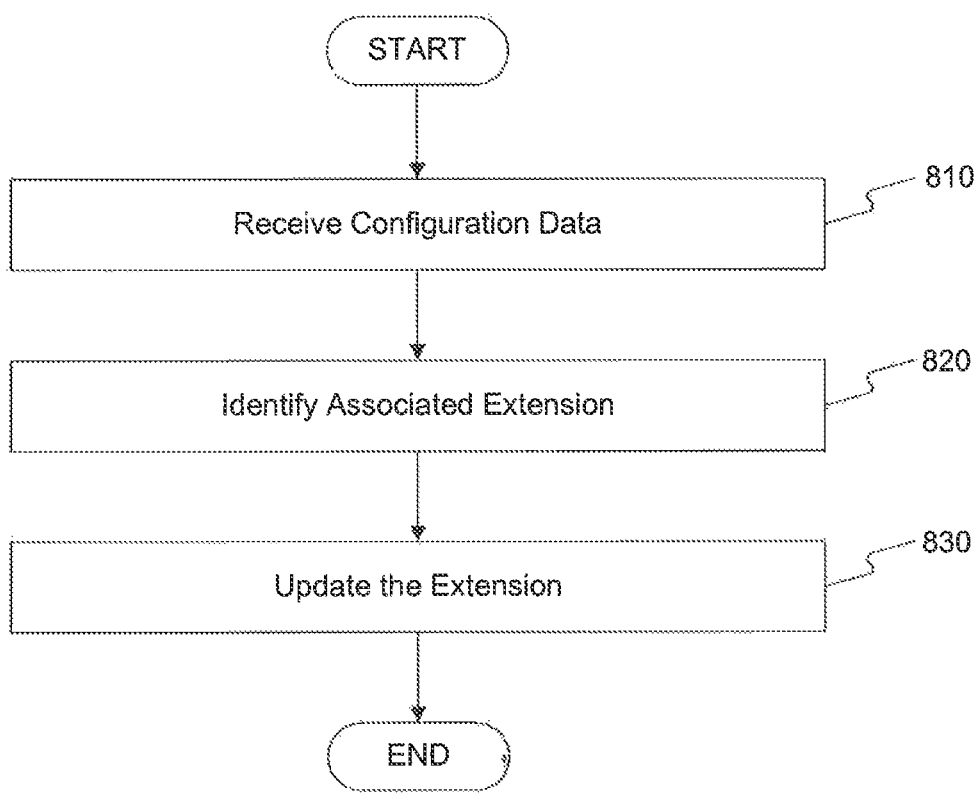
FIG. 8 is a flowchart of an example of a process for updating an extension; consistent with disclosed embodiments.

In addition to providing one or more of extensions 406 to a platform application 402, cloud sever 201 may be configured to update an extension 406. FIG. 8 is a flowchart of a process 800 for updating an extension 406, consistent with disclosed embodiments. In certain embodiments, cloud server 201 may execute software instructions to perform processes associated with updating one or more of extensions 406. In some aspects, the updating processes may be configured to modify an extension 406 already deployed to platform application 402. In this way, the extension 406 may be changed without being replaced by another extension 406, further allowing for customization of platform application 402.

To perform an extension update, cloud server 201 may receive configuration data associated with the update (step 810). The configuration data may include instructions for updating a particular aspect of an extension 406. For example, the update may include modifying application extension 407 to provide an additional functionality or modifying an advertisement extension 408 to provide a new offer or different content. In some embodiments, the configuration data may include data input by a consumer using mobile device 106. For example, a consumer may choose which features of a particular extension 406 that they want to be available and mobile device 106 may transmit the received preferences to cloud server 201 as configuration data.

To update the application platform extension 406, cloud server 201 may interpret the configuration data to identify the extension 406 to be updated (step 820). In this way, cloud server 201 may also determine the appropriate platform applications 402 and/or mobile devices 106 to which to provide the update. For example, the configuration data may indicate that a particular extension 406 for platform applications 402 associated with a particular financial institution should receive the update. In other embodiments, the configuration data may apply only to a particular extension 406 associated with one consumer's mobile device 106 and platform application 402, based on their received preferences.

After the extension 406 to be modified is identified, cloud server 201 may perform one or more processes to update the extension 406 (step 830). Cloud server 201 may transmit configuration data to mobile device 106, such as over wireless carrier network 105. Mobile device 106 may be configured to receive the configuration data related to the update and execute software instructions to perform one or more processes to implement the update.

Through processes 600 and 800, cloud server 201 may integrate extension 406 into a platform application 402 to allow for a customizable application that includes various service applications and advertisements. In some embodiments, the platform application 402 and extensions 406 may be associated with providing a customizable financial services application.

Figure 9:
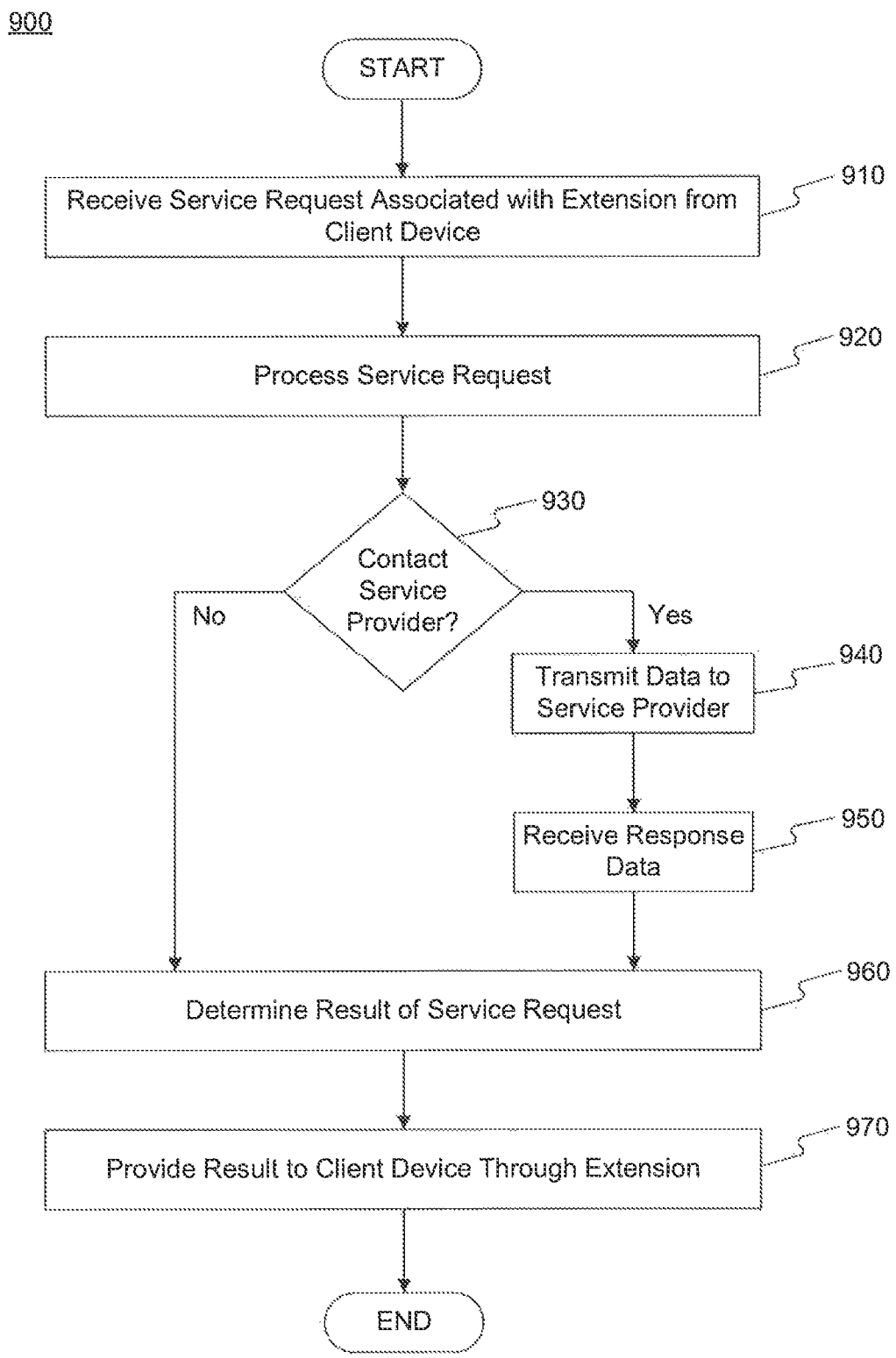
FIG. 9 is a flowchart of an example of a process for completing a service request associated with an extension, consistent with disclosed embodiments.

FIG. 9 is a flowchart of a process 900 for processing a financial service request from extension 406, consistent with disclosed embodiments. In certain embodiments, cloud server 201 may execute software instructions to perform one or more processes associated with processing the financial service request.

Cloud server 201 may receive a service request associated with extension 406 from mobile device 106 (step 910). As described above, the service request may be a financial service request. In one embodiment, the service request may be associated with a request for a P2P transfer of money.

Cloud server 201 may further be configured to process the service request (step 920). In order to process the service request, cloud server 201 may determine a financial cloud service 301 associated with the particular extension 406 and/or service request. The financial cloud service 301 may execute software instructions to perform appropriate processes configured to process the service request. For example, financial cloud service 301 may receive the service request from the extension 406 and may facilitate communication with other components of cloud server 201 (e.g., financial cloud controller 302 and financial cloud library 303), banking system 102, and/or third party service provider 103.

To further process the service request, cloud server 201 may determine whether to initiate communications with a service provider, such as banking system 102 and/or third party service provider 103 (step 930). For example, in the embodiment in which the service request is associated with a third party P2P transfer service, cloud server 201 may communicate with a third party P2P transfer service provide to complete a transaction (e.g., transfer of money) associated with the service request.

If cloud server 201 makes a determination to contact a service provider, cloud server 201 may transmit data to the service provider, such as over network 104 (step 940). The appropriate financial cloud service 301 may be programmed to gather the data to be sent the service provider so that the service provider may be able to complete the service request. For example, the financial cloud service 301 may be configured to gather account information (e.g., identification of financial account, financial account details) and service request information (e.g., amount of transfer) and transmit associated data to the service provider.

After receiving the data and locally processing the request, the service provider (e.g., third party service provider 103) may transmit a data response, which may be received by cloud server 201 (step 950). After receiving the response, or if communication with a service provider was not performed, cloud server 201 may determine a result of the service request (step 960). For example, cloud server 201 may determine if the service request was successful, unsuccessful, incomplete, approved, denied, etc. Cloud server 201 may execute additional instructions to determine whether to perform further processing or whether the process may be terminated.

In one embodiment, cloud server 201 may provide the determined result to mobile device 106 using the extension 406 associated with the service request (step 970). The result may include the result of the service request (e.g., completed, denied, etc.) and/or a request for additional information from the consumer and/or mobile device 106 to further processing of the request.

Figure 10:
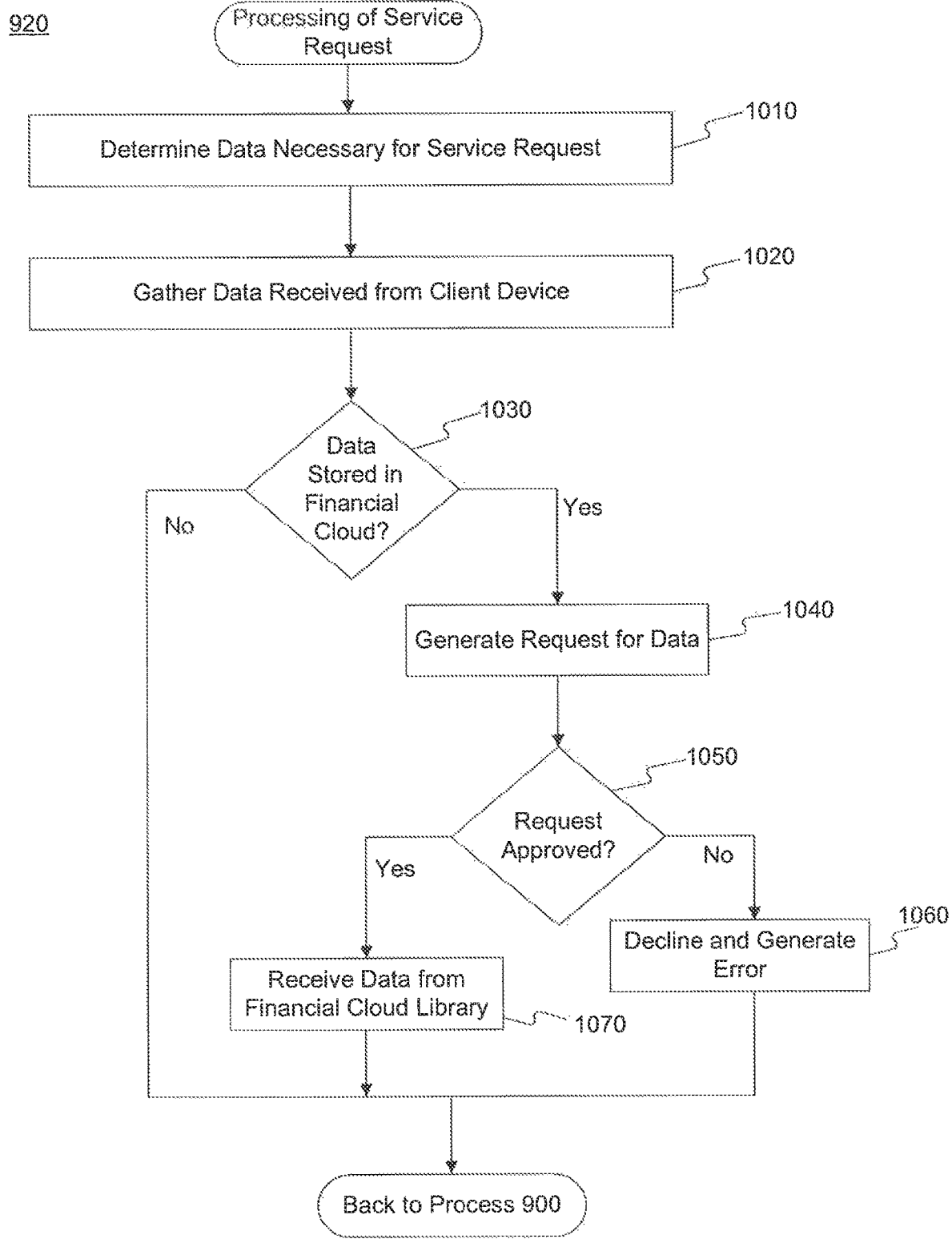
FIG. 10 is a flowchart of an example of a service request processing process, consistent with disclosed embodiments.

FIG. 10 is a flowchart of a process for processing a received service request (e.g., step 920). As described above, processing of the service request may be performed using one or more financial cloud services 301. Financial cloud service 301 may receive the service request and determine which data may be necessary for completion of the service request (step 1010). For example, financial cloud service 301 may determine that a service request for a P2P transfer requires amount information from mobile device 106 and account information from a financial cloud library 303. Financial cloud service 301 may proceed to gather the data.

Financial cloud service 301 may gather the data received with the service request from mobile device 106 (step 1020). For example, financial cloud service 301 may identify an amount of a P2P transfer. Financial cloud service 301 may proceed to determine if additional data for the service request is stored in cloud platform 101 (e.g., cloud server 201) (step 1030). If there is additional data stored in the cloud platform (e.g., financial account information), financial cloud service 301 may generate a request for the data (step 1040).

In one embodiment, a request for data may be generated by a cloud server 201 via a financial cloud service 301. The request may be processed using financial cloud controller 302. Financial cloud controller 302 may perform one or more security processes to approve or deny the request for data (step 1050). If the request is denied (e.g., not authorized or authenticated), financial cloud controller may generate an error, which may be transmitted back to mobile device 106 via financial cloud service 301 (step 1060). If the request is approved, financial cloud controller 302 may perform one or more processes to receive the data (step 1070). For example, financial cloud controller 302 may communicate with a financial cloud library 303, which may supply the requested data.

As a result of this process, financial cloud service 301 may have gathered data from mobile device 106 and cloud platform 101 for completing the service request. Financial cloud service 301 may continue to process the service request by transmitting a result to the mobile device 106 (e.g., to complete a service request for account information) or by performing further processing via communication with a service provider (e.g., to complete a P2P transfer request).

The processes depicted in FIGS. 9 and 10 may allow for a consumer to use extension 406 of a platform application 402 to perform one or more services (e.g., financial services) through the facilitation of cloud platform 101. Cloud platform 101 may be configured to store financial account information that may be used to complete requested services, such as financial account information received from banking system 102 and/or as a result of integration with banking system 102. The stored consumer financial account information may allow for secure integration of financial services through the platform application 402.

Cloud platform 101 may be configured to complete service requests by transmitting financial account information to service providers (e.g., third party service provider 103) from a secure networked infrastructure so that a consumer may access a variety of services, and initiate transactions directly from a platform application 402 associated with a financial institution. In this way, cloud platform 101 may use the consumer's accounts associated with the financial institution as a funding mechanism by which third party services, offers, and/or content are purchased or redeemed by the consumer.

Examples of financial services that may be provided via platform application 402 by way of one or more of extensions 406 include the ability of a consumer to view a list of financial institution accounts (e.g., checking, savings, credit card, mortgage, etc.), the ability to view the balance of any particular account, initiation of a fund transfer, initiation of a P2P fund transfer, purchase of gift cards, initiation of other types of mobile payment transactions, offer and coupon redemption, viewing of stock quotes, purchasing of stocks, credit/FICA score tracking, receipt/spending tracking, and the like.

Figure 11:
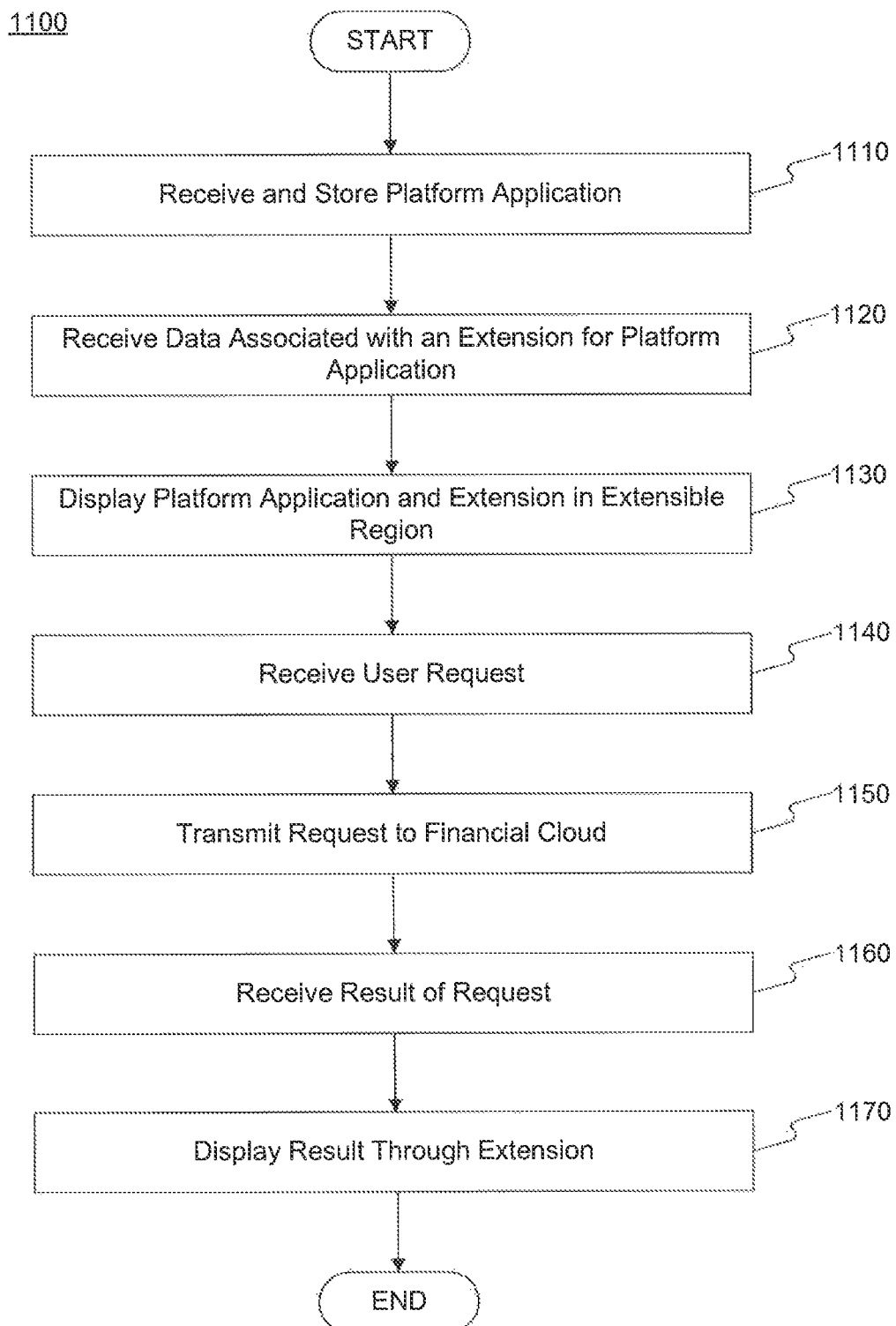
FIG. 11 is a flowchart of another example of a process for providing an extension to a platform application.

FIG. 11 is a flowchart of a process 1100 that may be performed by mobile device 106, consistent with disclosed embodiments. Mobile device 106 may execute instructions to perform process 1100 to receive, use, modify, and/or otherwise interact with platform application 402 and/or one or more of extensions 406.

In certain embodiments, mobile device 106 may receive and store platform application 402 (step 1110). The platform application 402 may be configured to be executed by processor 404 to display one or more user interfaces 501 that include one or more extensible regions 502, 505.

Mobile device 106 may receive data associated with extension 406 to be used in conjunction with platform application 402 (step 1120). The data associated with the extension 406 may include configuration data. Mobile device 106 may interpret the configuration data to determine the manner in which to integrate the extension 406 into the platform application 402. For example, the configuration data may include an extensible region 502 in which the extension 406 may be provided. The extensible region 502 may include identification of one or more icon regions 503 in a navigation menu or a tile regions 504 to which to provide the extension 406 or an aspect of the extension 406.

Mobile device 106 may proceed to display the platform application to the consumer, with the extension 406 presented in the appropriate extensible regions 502 (step 1130). In some embodiments, mobile device 106 may be configured such that a user may use an interface 405 of mobile device 106 to select, modify, and/or otherwise use each extension 406 displayed in an extensible region 502. In this way, the consumer may be allowed to interact with the platform application 402 and the displayed extensions 406.

Mobile device 106 may receive a user request from the consumer (step 1140). The user request may be one of several types of requests, such as requests to perform a service associated with extension 406, a request to change platform application 402 and/or extension 406, etc. In one example, the request may be associated with a financial service offered by one of the extension 406. The user may select the extension 406 using an interface 405 and associated data may be received by mobile device 106. The requested financial service may be to view financial account information, perform a banking service (e.g., intra-account fund transfer), perform a third party service (e.g., purchase a gift card), etc. In another example, the request may be a request to add, remove, replace, or modify extension 406. For example, the user may seek to customize the extensions 406 associated wither platform application 402.

In either instance, mobile device 106 may transmit data associated with the user request to cloud server 201 (step 1150). Cloud server 201 may perform one or more processes to complete the request. For example, cloud server 201 may obtain account information, communicate with third party service provider 103 to complete a financial service, or perform one or more processes to accommodate the user request for modification of the available extension 406.

After cloud server 201 processes the request, mobile device 106 may receive a result of the request (step 1160). The result may be requested information, confirmation of a completed financial service, a request for additional information, modification of extension 406, etc. The result may be displayed to the consumer (step 1170) via an interface 405.

FIGS. 12-16 show examples of user interfaces 501 that may be representative of a platform application 402 and extension 406. In particular, FIGS. 12-16 show user interfaces 501 associated with a financial institution platform application and financial service extensions.

Figure 12:
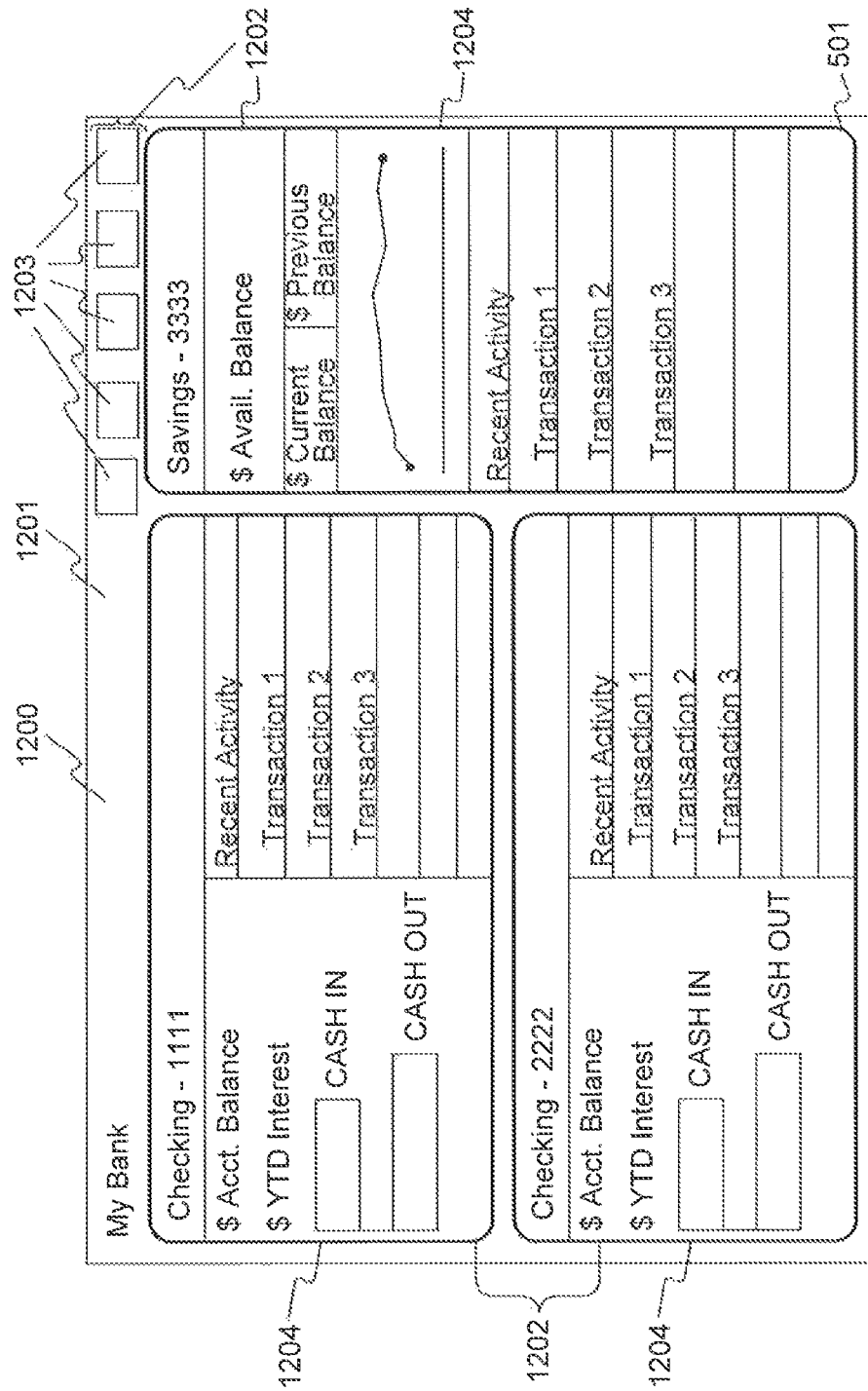
FIGS. 12-16 are examples of user interfaces for a platform application using financial service extensions

FIG. 12 shows an example of user interface 501 associated with an account dashboard 1200. Account dashboard 1200 may be an exemplary "home screen" of the financial institution platform application 402. Account dashboard 1200 may include a navigation bar 1201 including a plurality of extensible regions 1202 in the form of icon regions 1203, which may each include a selectable icon. Icons that may be included in the plurality of icon regions include, for example, icons associated with "INFO/HELP," "LOCATIONS," "BILL PAY," "TRANSFERS," and/or "DASHBOARD," functions. Each icon may be associated with a separate financial service extension. For example, the "TRANSFERS" icon may be associated with a financial service extension in which customers may initiate a transfer of money, such as from one financial account to another financial account, or to initiate another type of mobile payment transfer, such as a P2P payment transfer through a third party service provider 103.

Navigation bar 1201 may be configured to be extensible such that additional icons representing one or more financial service extensions may be added and such that existing icons may be removed. Each icon region 1203 may be configured such that selection of the icon and/or icon region 1203 may result in initialization of an associated financial service extension, which may be caused to be displayed in another extensible region, such as a full-screen region. In this way, financial institution and/or third party service information may be displayed to the consumer such that the consumer may use the financial service extension to receive information or further request a financial service.

Account dashboard 1200 may also include additional extensible regions 1202 in the form of tile regions 1204. Each tile region 1204 may be configured as a financial service extension, which may be an application extension 407 or an advertisement extension 408. Each financial service extension may be integrated into the user interface 501 of account dashboard 1200. Further, each tile region 1204 may be configured to provide and display information, such as financial data specific to a particular user's financial account, such as a checking account, savings account, or credit card account. In an embodiment, one or more tile regions 1204 may be configured to display checking account information while another tile region 1204 may be configured to display savings account information.

Further, within a given tile region 1204, account specific information, such as amount of interest earned, recent financial activity or transactions, available balance, etc., may be provided. Tile regions 1204 can be further configured to provide data represented as charts, graphs, or any other visual representations of data.

Figure 13:
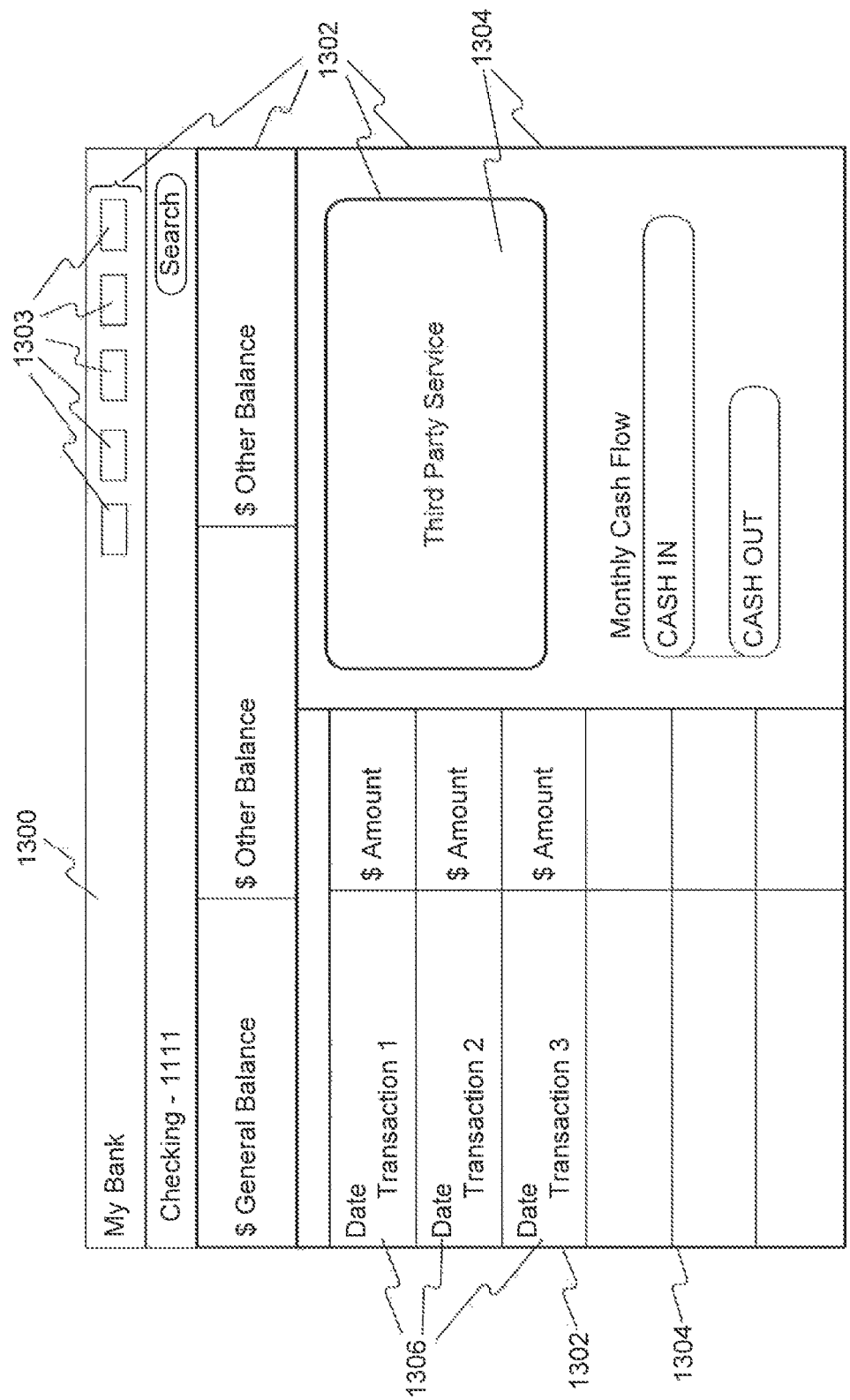

FIG. 13 shows an example of a user interface 1300. User interface 1300 may include a plurality of extensible regions 1302 in the form of icon regions 1303 and tile regions 1304. Icon regions 1303 may serve as navigation components configured to direct mobile device 106 to execute instructions to perform a process, such as open a financial service extension different from the financial service extension currently being used and/or shown. Each tile region 1304 may include separate financial service extensions that may be used by the consumer, or may be related components of the same financial service extension. One or more of the tile regions 1304 may include a financial service extension associated with a third party service provider. The third party financial service extensions may be operably coupled to the associated third party service provider 103 through cloud server 201.

The third party financial service extensions may be configured to provide any type of third party content (e.g., advertisements, offers, product purchases, P2P services, etc.). In this way, the financial institution associated with the platform application may be allowed to provide new features and functionality to the platform application through integration of third party services.

User interface 1300 may further include account details, including detailed account transaction information. Each tile region 1304 may further Include selectable regions 1306 that can be configured to respond to user input and trigger another extensible region 1302 (e.g., another tile region 1304) to be presented in association with the selection.

Figure 14:
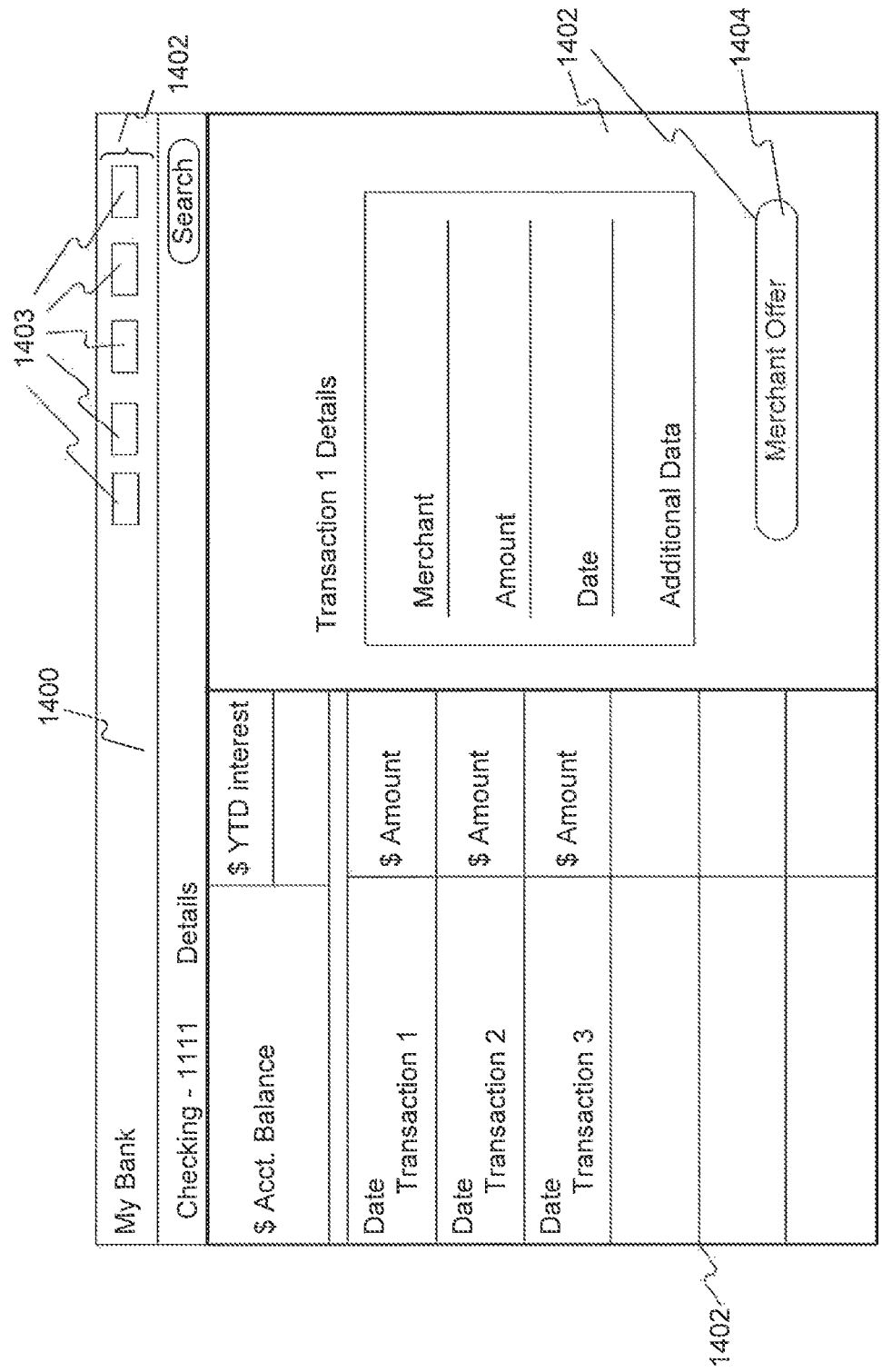

FIG. 14 shows an example of a user interface 1400 displaying account details displayed based on a selection of a transaction in user interface 1300. User interface 1400 may include extensible regions 1402 in the form of icon regions 1403 (which may correspond to an serve the same purpose as icon regions 1303 of user interface 1300) and tile regions 1404. At least one of tile regions 1404 depicts a merchant offer tile incorporated into an account transaction detail tile. Selection of the merchant offer tile may cause mobile device 106 to execute instructions to perform a process associated with the merchant offer, such as display additional details regarding the merchant offer, open a merchant web page on mobile device 106, etc.

In one embodiment, data associated with the transaction detail (e.g., metadata) can be analyzed and correlated to a particular third party financial service application to provide a targeted consumer offer that relates to the presented transaction. In this way, financial service extensions may be further used in conjunction with each other to provide an integrated financial service experience.

Figure 15:
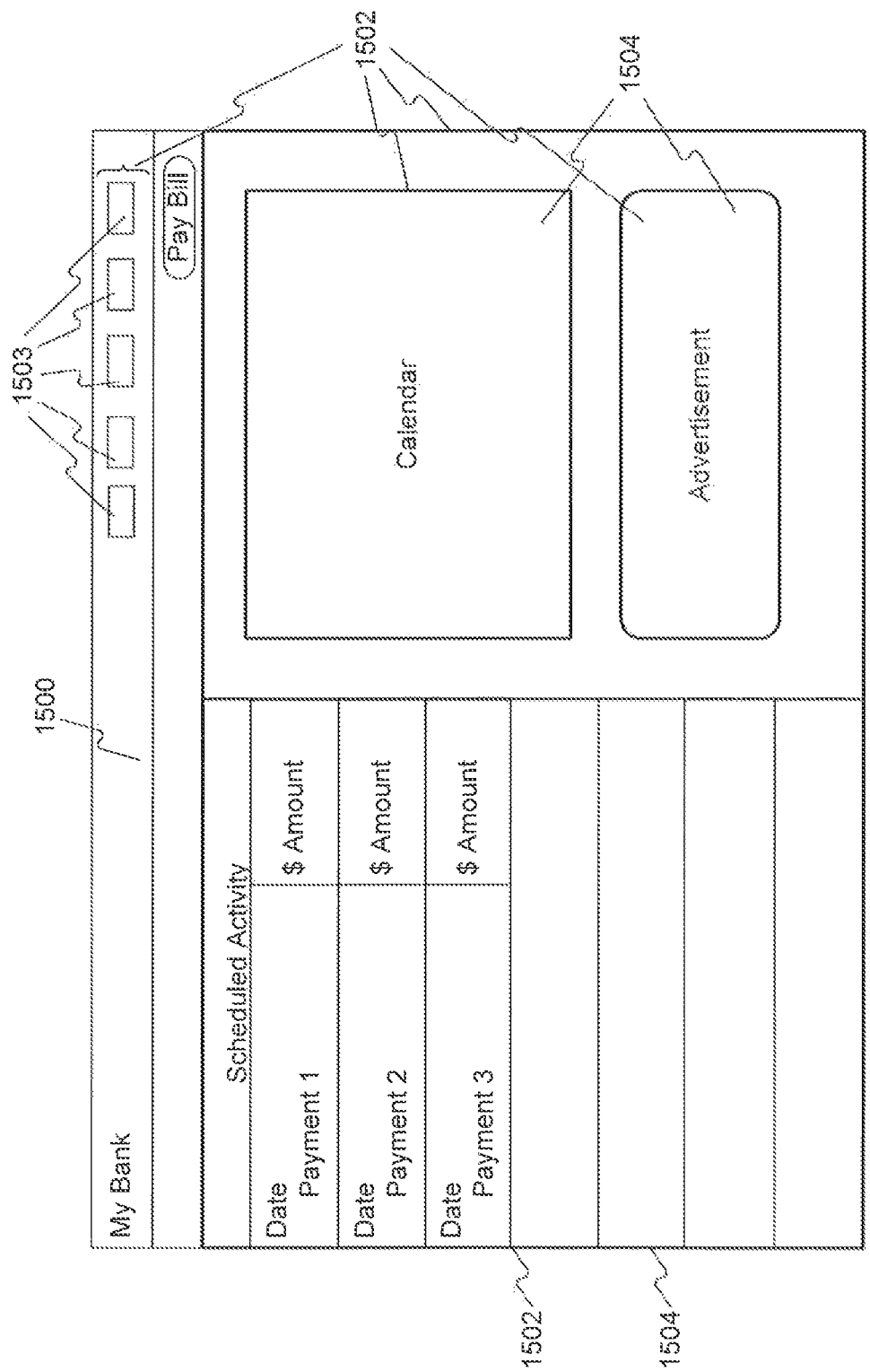

FIG. 15 illustrates an example of a user interface 1500 depicting a bill payment extension. Extensible regions 1502 may include icon regions 1403 (which may correspond to icon regions 1303 and 1403) and tile regions 1504. Tile regions 1504 may be configured to provide a bill payment function to the consumer. In some embodiments, the bill payment extension may be a third party financial service extension, in which payment to a third party is made via cloud server 201.

Figure 16:
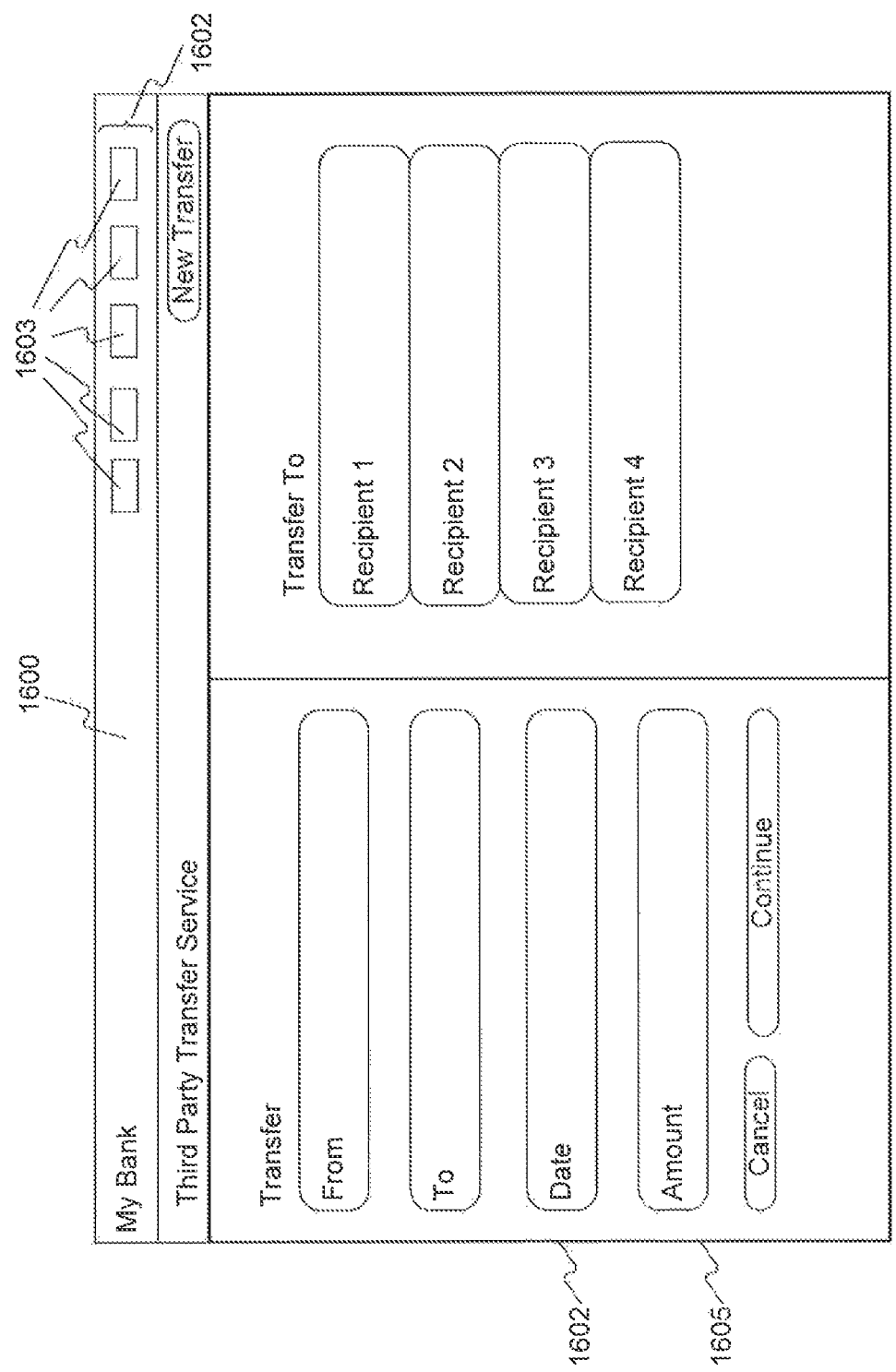

FIG. 16 illustrates an example of a user interface 1600 depicting an exemplary P2P money transfer extension. The consumer may use the P2P money transfer extension to access a third party service provider 103 for transferring money to another person, for example. The P2P money transfer extension may be displayed in an extensible region 1602 in the form of a full-screen tile 1605. The user may interact with the P2P money transfer extension to input data related to a money transfer. Mobile device 106 may transmit data associated with the money transfer to cloud server 201 for processing of the money transfer, including further transmission of data to a third party service provider 103 associated with providing P2P transfer services. As shown in FIG. 16, user interface 1600 may further include extensible regions 1602 in the form of icon regions 1603, which may be the same as or similar to icon regions 1203, 1303, 1403, and 1503.

The examples of financial service extensions depicted in FIGS. 12-16 generally relate to viewing financial account information and performing financial transactions associated with the financial accounts. It should be understood, however, that financial service extensions may include other types of services, which may or may not be directly related to a financial institution. For example, in one embodiment, a customer service extension may be provided for use with a platform application 402, which may be installed on mobile device 106. The user of mobile device 106 may use the customer service extension to contact a customer service center. FIGS. 17-21 depict exemplary systems and methods that may be associated with a customer service extension.

Figure 17:
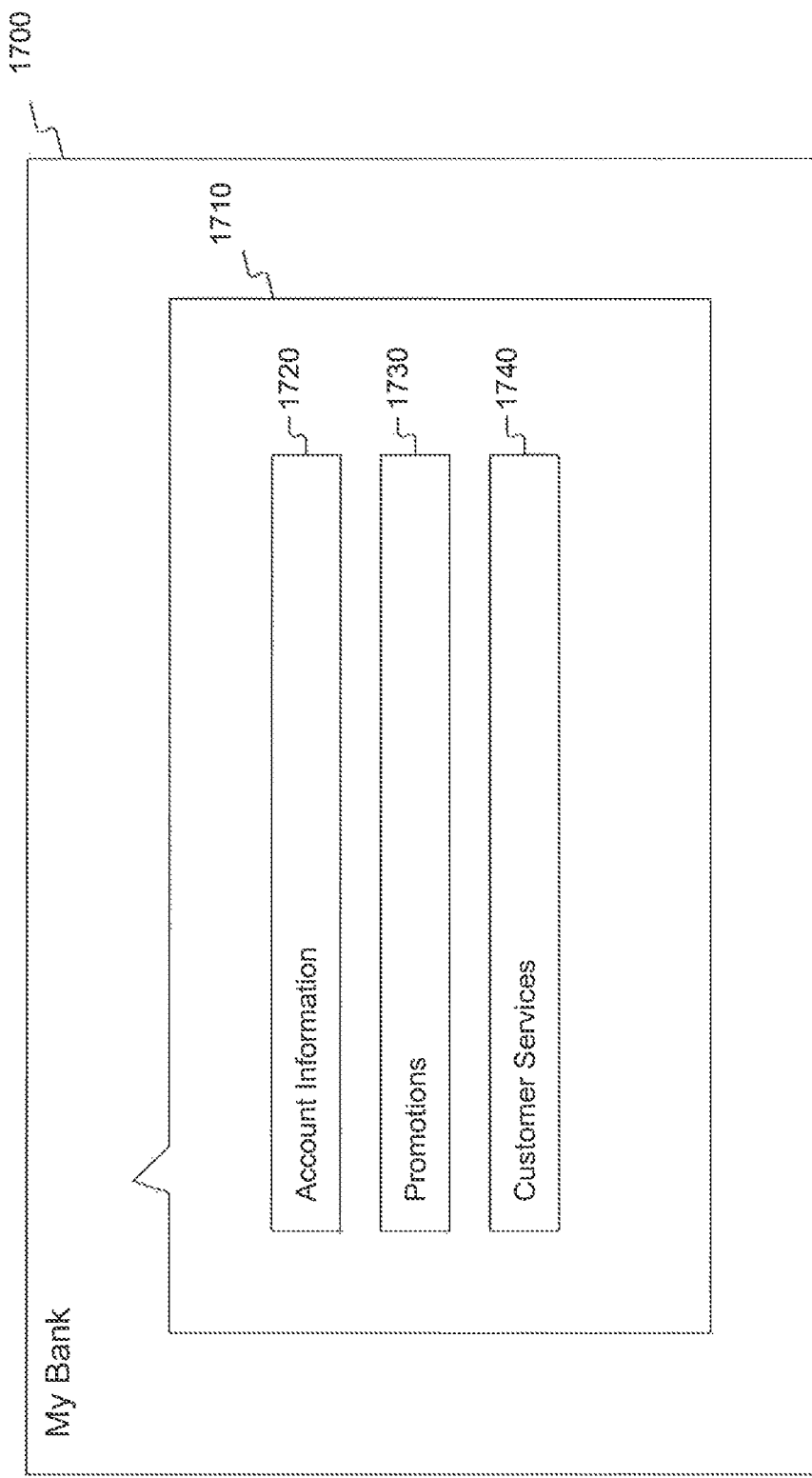
FIGS. 17-20 are examples of user interfaces associated with a customer service extension for a platform application.

FIG. 17 shows an example user interface 1700 displayed on mobile device 106. User interface 1700 may be associated with one or more financial service extensions. User interface 1700 depicts a menu 1710. Menu 1710 may include options that a user may select, including options related to products and services provided by a company, such as a financial institution. Menu 1710 includes "Account Information" item 1720, "Promotions" item 1730, and "Customer Services" item 1740. Each item in menu 1710 may be associated with a different financial service extension. For example, when the user selects item 1720 for account information, an account information extension may be initiated and user interface 1700 may display another user interface (not shown) showing account information associated with an account of the user. The account information may include various information including, for example, options for viewing information associated with different accounts, account balances, transaction history, and user preference settings.

When the user selects item 1730 for promotions, a promotions extension may be initiated and user interface 1700 may display another user interface (not shown) showing promotions to the user. Promotions may include any suitable promotions for products or services, such as those described with respect to advertisement extensions 408. Promotions shown to the user may be standard promotions or customized promotions. Customized promotions may be customized based on the user's age, education, income, or other existing account Information, the user's interests, or the user's historical contact with customer service center.

Figure 18:
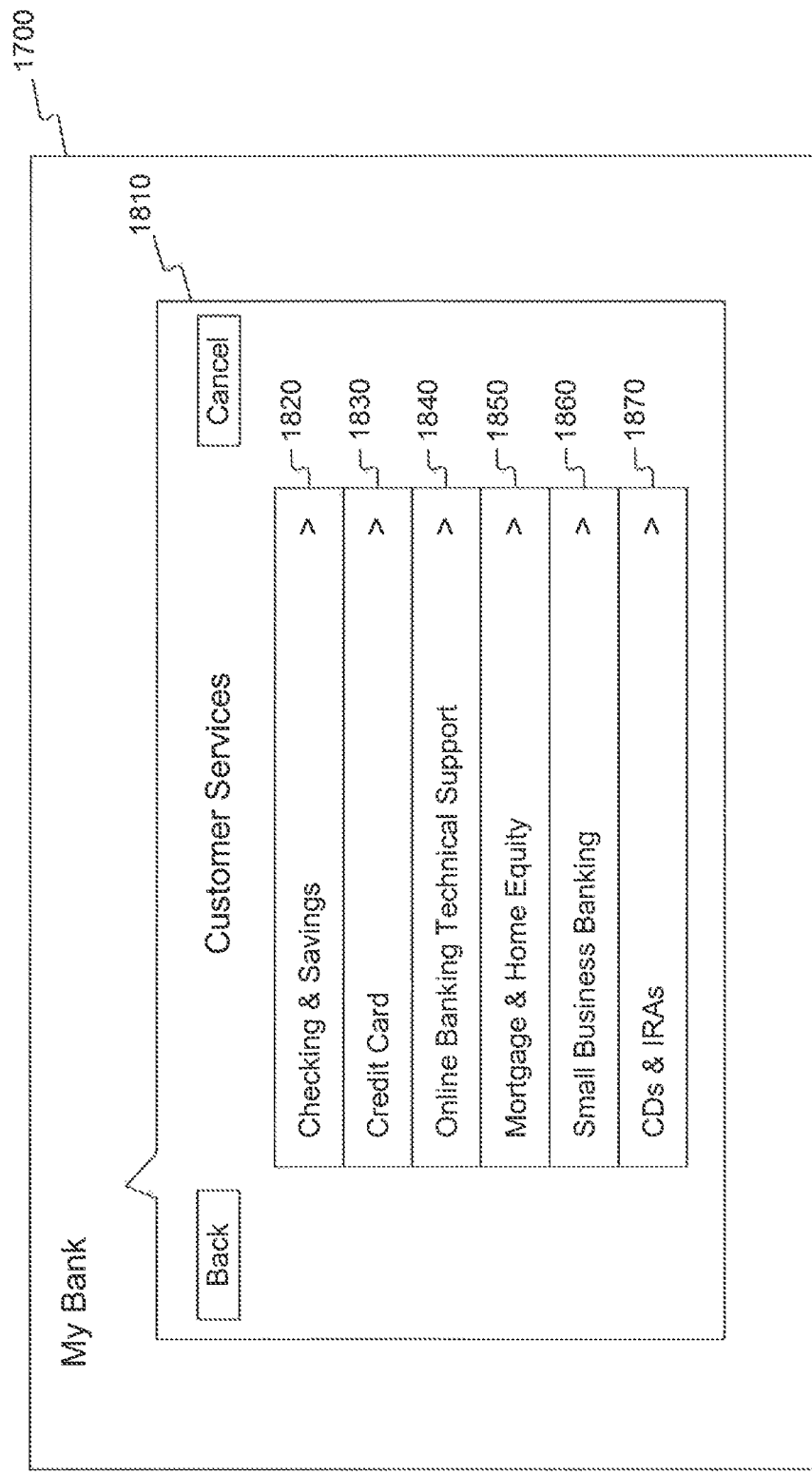

FIG. 18 illustrates an example of user interface 1700 of mobile device 106 that depicts a menu 1810 associated with a customer service extension. Mobile device 106 may display menu 1810 when the user selects "Customer Services" item 1740 in FIG. 17, which may initiate the customer service extension. Menu 1810 may display a list of selectable items. The items may include, for example, a first item 1820 for customer services for checking and savings accounts, a second item 1830 for customer services for credit cards, a third item 1840 for customer services for online banking technical support, a fourth item 1850 for customer services for mortgage and home equity, a fifth item 1860 for customer services for small business banking, and a sixth item 1870 for CDs and IRAs.

Figure 19:
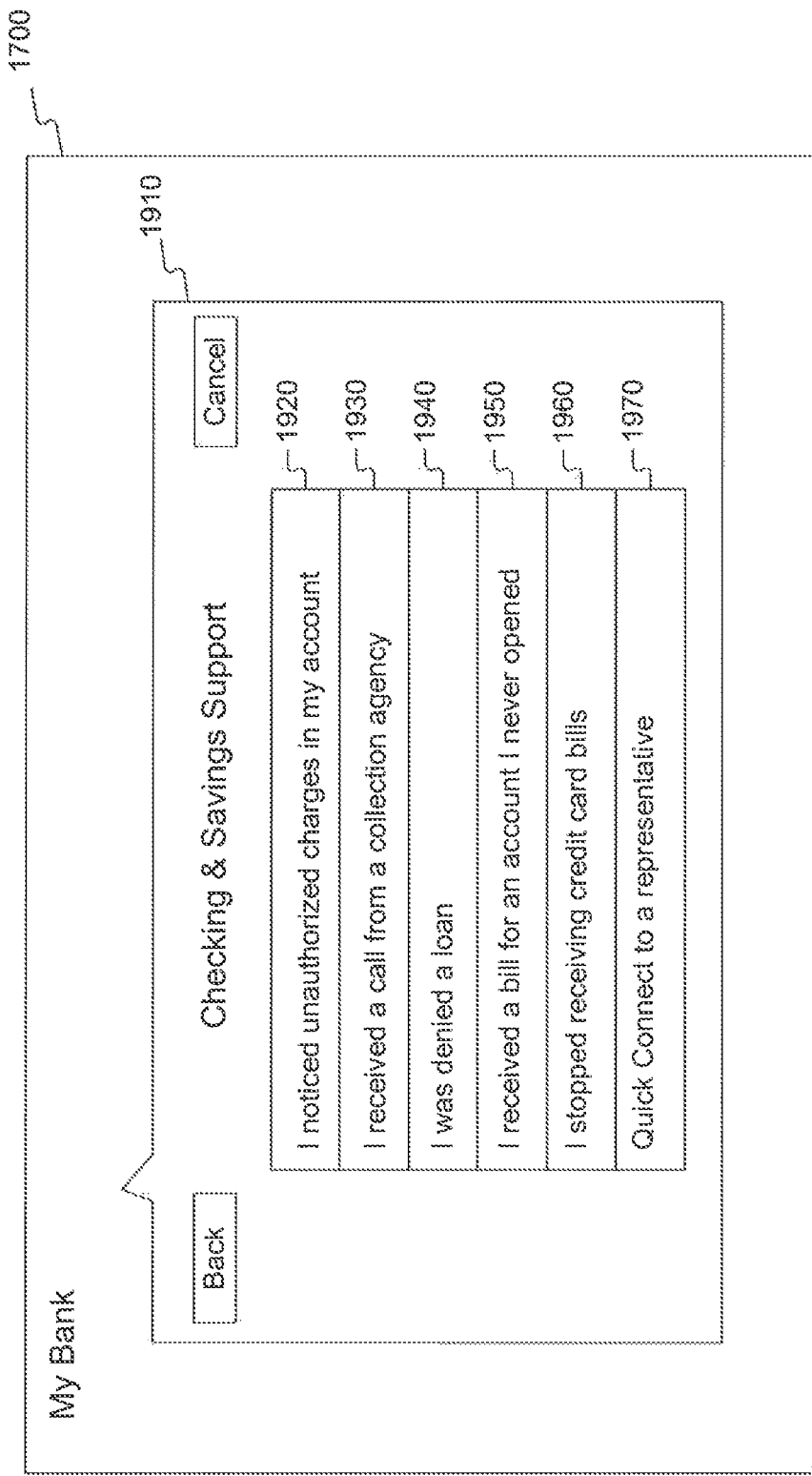

FIG. 19 shows an example of a menu 1910 displayed on user interface 1700 when the customer selects the first item 1810 for customer service for checking and savings accounts. Menu 1910 may display a list of customer service topics for the customer to select. The customer service topics may include, for example, a first topic 1920, "I noticed unauthorized charges in my account," a second topic 1930, "I received a call from a collection agency," a third topic 1940, "I was denied a loan," a fourth topic 1890, "I received a bill for an account I never opened," a fifth topic 1960, "I stopped receiving credit card bills," and a sixth topic 1970, "Quick Connect to a representative." When the customer selects the sixth topic 1970, the customer will be connected to a representative using a default communication option, such as chat, call, or video, which the customer may set in the settings in the user's account or a settings portion related to customer services. For example, when the user selects item 1740 for customer services, user interface 1700 may display a user interface for the user to set the default communication option for contacting a customer service representative.

Figure 20:
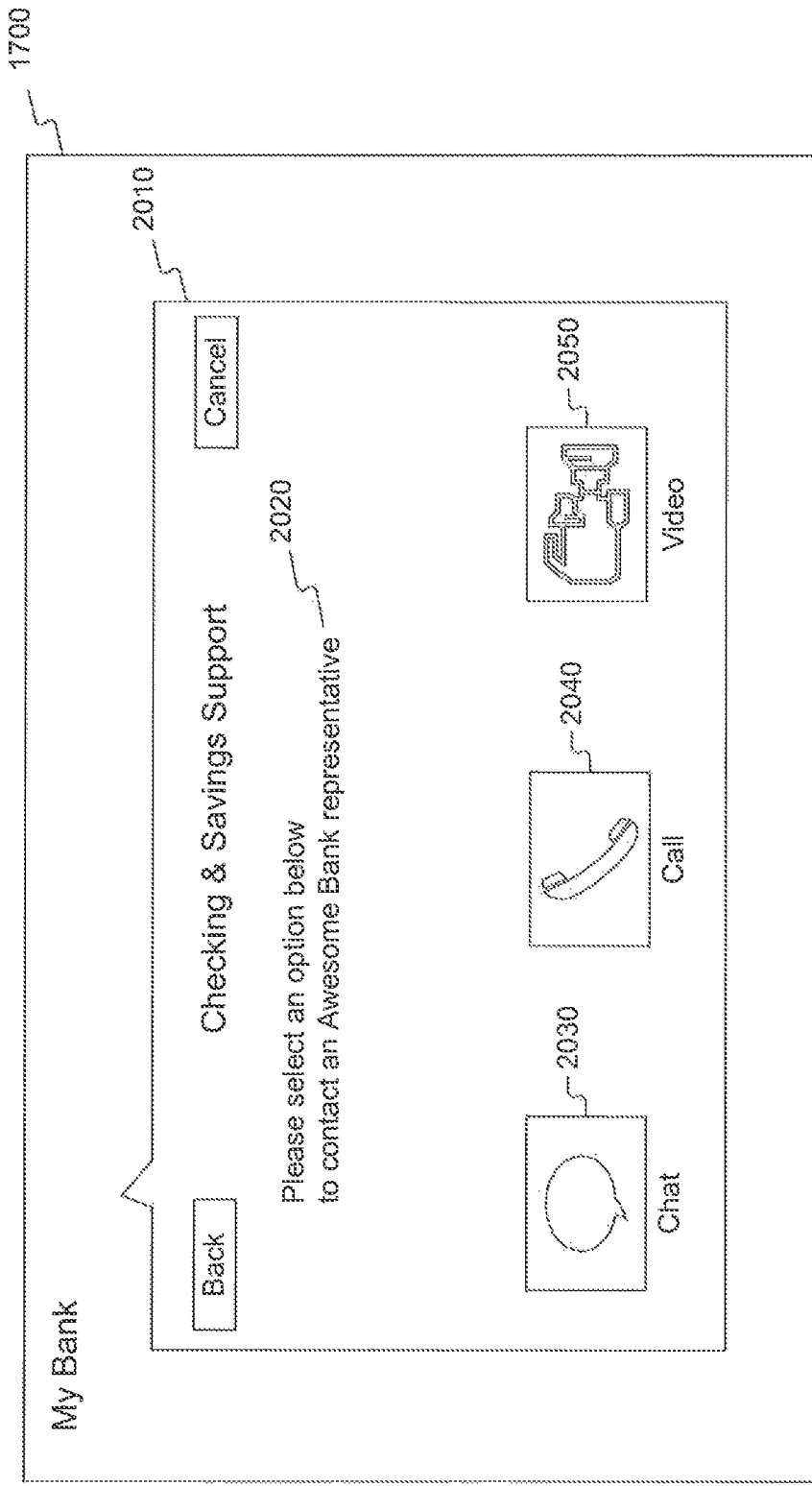

FIG. 20 shows an example of a menu 2010 displayed on user interface 1700 when the user selects any one of the customer service topics 1920-1960 shown in FIG. 19. Menu 2010 may display a message 2020 prompting the user to select a communication option for contacting a customer service representative. For example, menu 2010 may display a plurality of communication options for the customer to select. In some embodiments, each communication option may be associated with a different customer service extension.

As shown in FIG. 20, menu 2010 may display a chat icon 2030 representing contacting a customer service representative through an online chat function. While the online chat function may be associated with a customer service extension, it should be understood that the online chat function may be an integrated component of platform application 402 (e.g., not provided as an extension 406) or mobile device 106 (e.g., a separate mobile application). The online chat function may also use an online chat application provided by a third party, which may be provided as a third party extension through cloud server 201. When the customer selects chat icon 2030, platform application 402 may start the third party online chat extension or an integrated online chat function associated with platform application 402.

Referring to FIG. 20, menu 2010 may display a call icon 2040 representing contacting a customer service representative through a telephone, such as a telephone function of mobile device 106. When the customer selects call icon 2040, platform application 402 may start a call function of mobile device 106, or may display a message requesting the customer to call a customer service phone number using another phone.

Referring to FIG. 20, menu 2010 may also display a video chat icon 2050 representing contacting a customer service representative using a video chat function. The video chat function may be an extension 406, a component of platform application 402, or a separate mobile application on mobile device 106. The video chat function may be associated with a third party video chat application, either through mobile device 106 or through cloud server 201 via a third party extension. When the customer selects video chat icon 2050, platform application 402 may start the corresponding video chat function or application.

Referring to FIGS. 19 and 20, when the customer selects one of the communication methods discussed above, or when the customer selects item 1970 for quick connection to a customer service representative, mobile device 106 may send a request to connect to a customer service center. Mobile device 106 may also transmit context information to the customer service center. The context information may be transmitted substantially simultaneously when the customer selects either quick connection item 1970 or any one of the communication options displayed in FIG. 20. The customer service center may forward the context information to a terminal (e.g., a computer, tablet, smartphone, etc.) being used by a customer service representative to help the customer service representative understand the issues of the customer. The context information may include various information that platform application 402 or an associated extension 406 may record regarding the user's interaction with platform application 402 and/or extension 406. For example, the context information may Include the user's name, address, and account information such as account type, balance, transaction history, etc. The context information may also include history Information related to the user's interactions with platform application 402 and/or extension 406, such as the user's selection of one of the customer service topics 1920-1960, or the user's selections of the first item 1820 and then subsequently, the item 1940. For example, platform application 402 may record a chain of selections made by the user at different levels of extensions.

Figure 21:
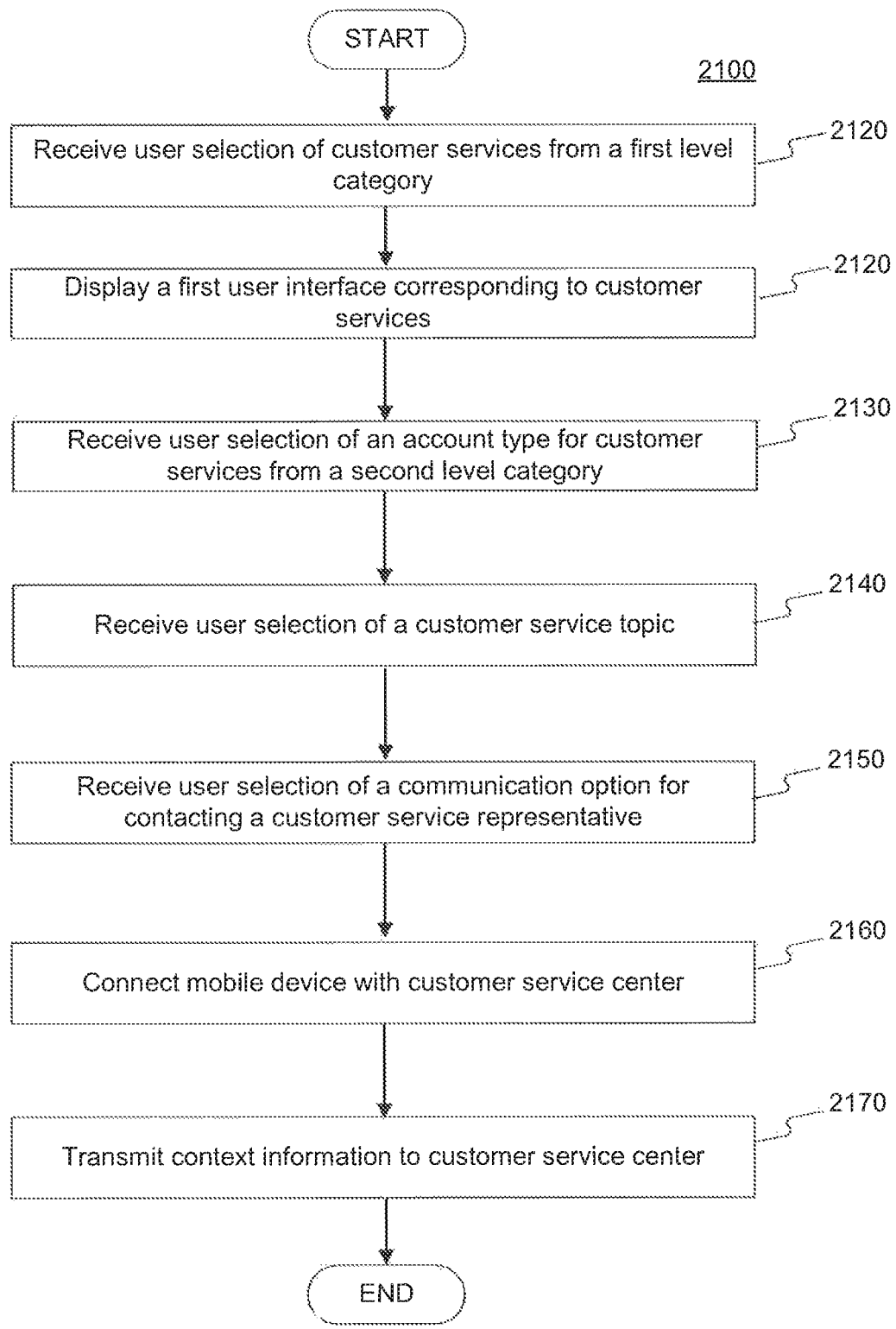
FIG. 21 is a flowchart of an example of a process for providing and using a customer service extension.

FIG. 21 shows an example of a process 2100 that mobile device 106 may perform using platform application 402 and one or more customer service extensions. Process 2100 may represent at least a portion of the operations performed by a customer service extension, depending on the configuration of platform application 402.

Mobile device 106 may receive a user selection of customer services from a first level category (step 2120). The first level category may be, for example, menu 1710 shown in FIG. 17, which may include "Customer Services" item 1740. The user may select "Customer Services" item 1740. In some embodiments, selection of item 1740 may initiate the customer service extension.

Next, mobile device 106 may display a first user interface corresponding to customer services (step 2120). For example, after the user selects "Customer Services" item 1740, mobile device 106 may display menu 1810, as shown in FIG. 18. Mobile device 106 may receive a user selection of an account type for customer services from a second level category (step 2130). For example, the user may select first item 1820 from the second level category shown in FIG. 18, which includes items 1820-1870.

Next, mobile device 106 may receive a user selection of a customer service topic (step 2140). For example, after the user selects item 1820 from the second level category in FIG. 18, the user may select the first customer service topic 1920 from a third level category, which may include topics 1920-1970 shown in FIG. 19. Mobile device 106 may further receive user selection of a communication option for contacting a customer service representative (step 2150). For example, the user may select chat icon 2030 from FIG. 20. Mobile device 106 may then connect to a customer service center through the user selected communication option (step 2160). Mobile device 106 may use the customer service extension to connect to a customer service center associated with a financial institution and/or a third party. The connection may be made via communication with cloud server 201 and one or more third party service providers 103.

Next, mobile device 106 may transmit context information to the customer service center (step 2170). The context information may be transmitted substantially simultaneously with the connection to the customer service center via cloud server 201. The customer service center may make the context information available to a customer representative so that the customer representative can understand the question or issue that the user has, without requiring the user to repeat the question or issue the user has. For example, the customer service center may forward the context information to a terminal (e.g., a computer, tablet, smartphone, etc.) being used by a customer service representative to help the customer service representative understand the issues of the customer. This may result in more efficient and higher quality customer services. After step 2170, the process may end.

A user may control mobile device 106 to execute instructions to perform process 2100 to use a customer service extension associated with platform application 402. In this way, the user may communicate with a customer service center through cloud server 201, which may allow for the convenient use of account information stored in cloud server 201. Further, the integration of the customer service extension into platform application 402 may allow for additional information, such as context information associated with use of platform application 402 or other extensions 406, to be supplied to a customer service center for use in addressing customer requests and issues.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer readable media, such as secondary storage devices, for example, hard disks, floppy disks, or CD ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method of integrating an extension into a platform application of a mobile device, the method comprising:
    sending, from a platform application of a mobile device to a cloud platform comprising one or more web servers connected via a network, a request for an extension to be loaded in the platform application and for making a service available within the platform application, the request including data identifying a user of the platform application and initialization data that identifies one or more communication channels for transmitting data between a system associated with the platform application, a third party service provider associated with the extension, and the cloud platform to perform the service;
    receiving, at the mobile device, an extension, based on the request and a determination that the extension is accessible to the user based on the identifying data, and configuration data comprising enabling instructions for allowing communication of data between the extension, the third party service provider associated with the extension, and the cloud platform to perform the service, and including instructions for causing the extension to be displayed in an extensible region, an indication of whether the extension replaces a second extension, and instructions to deactivate the second extension, wherein deactivating the second extension comprises removing data associated with the second extension from the mobile device;
    integrating, at the mobile device, the received extension in an extensible region of the platform application based on the enabling instructions;
    executing, at the mobile device, the received extension within the extensible region of the platform application, comprising displaying an interface in the platform application, receiving a user input, and initiating a request to the service provider via the cloud platform to perform the service; and
    receiving, at the mobile device, a response from the service provider via the cloud platform in response to the initiated request.

2. The method of claim 1, the method further comprising:
    receiving the platform application at the mobile device; and
    storing the platform application at the mobile device.

3. The method of claim 1, wherein the extensible region comprises an icon region or a navigation region.

4. The method of claim 3, wherein the received extension comprises a financial service extension that is configured to initialize a display of an associated financial service application.

5. The method of claim 1, wherein the user input is received at the displayed interface of the received extension.

6. The method of claim 1, wherein the configuration data further includes at least one of:
    display data specific to the mobile device for presentation of the extension with the platform application; or
    an identification of the extensible region.

7. The method of claim 6, wherein the configuration data further includes an instruction to remove the second extension from the extensible region.

8. The method of claim 1, wherein the response comprises at least one of:
    a result of the initiated request or a request for additional information; or
    a request to add, remove, replace, or modify the extension.

9. A mobile device for processing a service request associated with an extension, the mobile device comprising:
    a storage device that stores a set of instructions; and
    at least one processor that executes the set of instructions, the set of instructions configuring the at least one processor to:
        send, from a platform application of a mobile device to a cloud platform comprising one or more web servers connected via a network, a request for an extension to be loaded in the platform application and for making a service available within the platform application, the request including data identifying a user of the platform application and initialization data that identifies one or more communication channels for transmitting data between a system associated with the platform application, a third party service provider associated with the extension, and the cloud platform to perform the service;

receive, at the mobile device, an extension, based on the request and a determination that the extension is accessible to the user based on the identifying data, and configuration data comprising enabling instructions for allowing communication of data between the extension, the third party service provider associated with the extension, and the cloud platform to perform the service, and including instructions for causing the extension to be displayed in an extensible region, an indication of whether the extension replaces a second extension, and instructions to deactivate the second extension, wherein deactivating the second extension comprises removing data associated with the second extension from the mobile device;

integrate, at the mobile device, the received extension in an extensible region of the platform application based on the enabling instructions;

execute, at the mobile device, the received extension within the extensible region of the platform application, comprising displaying an interface in the platform application, receiving a user input, and initiating a request to the service provider via the cloud platform to perform the service; and receive, at the mobile device, at the mobile device, a response from the service provider via the cloud platform in response to the initiated request.

10. The mobile device of claim 9, wherein the set of instructions further configure the at least one processor to:
receive the platform application at the mobile device; and
store the platform application at the mobile device.

11. The mobile device of claim 9, wherein the extensible region comprises an icon region or a navigation region.

12. The mobile device of claim 11, wherein the received extension comprises a financial service extension that is configured to initialize the display of an associated financial service application.

13. The mobile device of claim 9, wherein the configuration data further includes at least one of:
display data specific to the mobile device for presentation of the extension with the platform application; or
an identification of the extensible region.

14. The mobile device of claim 13, wherein the configuration data further includes an instruction to remove the second extension from the extensible region.

15. The mobile device of claim 9, wherein the response comprises at least one of:
a result of the initiated request or a request for additional information; or
a request to add, remove, replace, or modify the extension.

16. A tangible, non-transitory computer-readable storage device for processing a service request associated with an extension, the storage device including a set of instructions that, when executed, cause at least one processor to:
send, from a platform application of a mobile device to a cloud platform comprising one or more web servers connected via a network, a request for an extension to be loaded in the platform application and for making a service available within the platform application, the request including data identifying a user of the platform application and initialization data that identifies one or more communication channels for transmitting data between a system associated with the platform application, a third party service provider associated with the extension, and the cloud platform to perform the service;

receive, at the mobile device, an extension, based on the request and a determination that the extension is accessible to the user based on the identifying data, and configuration data comprising enabling instructions for allowing communication of data between the extension, the third party service provider associated with the extension, and the cloud platform to perform the service, and including instructions for causing the extension to be displayed in an extensible region, an indication of whether the extension replaces a second extension, and instructions to deactivate the second extension, wherein deactivating the second extension comprises removing data associated with the second extension from the mobile device;

integrate, at the mobile device, the received extension in an extensible region of the platform application based on the enabling instructions;

execute, at the mobile device, the received extension within the extensible region of the platform application, comprising displaying an interface in the platform application, receiving a user input, and initiating a request to the service provider via the cloud platform to perform the service; and receive, at the mobile device, a response from the service provider via the cloud platform in response to the initiated request.

17. The tangible, non-transitory computer-readable storage device of claim 16, wherein the configuration data further includes at least one of:
display data specific to the mobile device for presentation of the extension with the platform application; or
an identification of the extensible region.

18. The tangible, non-transitory computer-readable storage device of claim 17, wherein the configuration data further includes an instruction to remove the second extension from the extensible region.

19. The tangible, non-transitory computer-readable storage device of claim 16, wherein the response comprises at least one of:
a result of the initiated request or a request for additional information; or
a request to add, remove, replace, or modify the extension.

* * * * *